(12) United States Patent
Spengler et al.

(10) Patent No.: US 12,516,763 B2
(45) Date of Patent: Jan. 6, 2026

(54) CONNECTOR FOR COUPLING A PARTICLE OUTLET OF A HANDHELD MACHINE TOOL TO A PARTICLE RECEIVING DEVICE, HANDHELD MACHINE TOOL, HANDHELD MACHINE TOOL ASSEMBLY, AND METHOD

(71) Applicant: Festool GmbH, Wendlingen (DE)

(72) Inventors: Wolfgang Spengler, Neidlingen (DE); Jonathan Caputo, Althengstett (DE); Boris Seyfried, Reutlingen (DE); Jonathan Weik, Filderstadt (DE); Marco Christoph Brosch, Wolfschlugen (DE)

(73) Assignee: FESTOOL GmbH, Wendlingen (DE)

( * ) Notice: Subject to any disclaimer, the term of this patent is extended or adjusted under 35 U.S.C. 154(b) by 0 days.

(21) Appl. No.: 19/187,101

(22) Filed: Apr. 23, 2025

(65) Prior Publication Data
US 2025/0327542 A1    Oct. 23, 2025

(30) Foreign Application Priority Data

Apr. 23, 2024  (EP) .................................... 24171911

(51) Int. Cl.
*F16L 37/248*  (2006.01)
*F16L 37/53*  (2006.01)
*B23Q 11/00*  (2006.01)

(52) U.S. Cl.
CPC ............. *F16L 37/248* (2013.01); *F16L 37/53* (2013.01); *B23Q 11/0046* (2013.01); *B23Q 11/0071* (2013.01)

(58) Field of Classification Search
CPC ..... F16L 27/0808; F16L 37/53; F16L 37/248; F16L 37/252; F16L 37/107; F16L 37/113; B23Q 11/0071; A47L 7/0095
(Continued)

(56) References Cited

U.S. PATENT DOCUMENTS 1,195,433 A * 8/1916 De Witt ................ F16L 37/252
                                                                 285/259
2,423,069 A * 6/1947 McElhose ............... F16L 27/08
                                                                 285/190
(Continued)

FOREIGN PATENT DOCUMENTS

DE   10 2014 001 349 A1   8/2015
DE   10 2023 203 889 A1   10/2024
(Continued)

OTHER PUBLICATIONS

European Search Report received in European Patent Application No. 24171911.1 mailed on Sep. 30, 2024, 6 pages.
(Continued)

*Primary Examiner* — David Bochna
(74) *Attorney, Agent, or Firm* — Grüneberg and Myers PLLC

(57) ABSTRACT

A connector for coupling a particle outlet of a handheld machine tool to a particle receiving device is described. The connector has a tube-shaped inlet portion extending along an inlet axis and a tube-shaped outlet portion extending along an outlet axis. The tube-shaped outlet portion is for coupling to the particle receiving device. The inlet portion has a body section and an engagement section. The engagement section is resiliently coupled to the body section. The engagement section has an engagement geometry for mating with an engagement counter-geometry on the particle outlet, such that a positive locking effective along a circumferential direction is provided between the engagement geometry and the engagement counter-geometry. Moreover, a lock is coupled to the inlet portion. The lock is for selectively blocking a movement of the engagement section relative to the body section. Moreover, a handheld machine tool, a
(Continued)

handheld machine tool assembly, and a method for operating a handheld machine tool assembly are presented.

14 Claims, 11 Drawing Sheets

(58) Field of Classification Search
USPC .......................................... 285/277, 92, 276
See application file for complete search history.

(56) References Cited

U.S. PATENT DOCUMENTS

| | | | | |
|---|---|---|---|---|
| 2,587,938 | A * | 3/1952 | Warren | B05B 15/652 |
| | | | | 285/317 |
| 5,586,791 | A * | 12/1996 | Kirchner | F16L 37/0985 |
| | | | | 285/179 |
| 6,553,613 | B2 * | 4/2003 | Onishi | A47L 9/242 |
| | | | | 285/184 |
| 6,581,974 | B1 * | 6/2003 | Ragner | A47L 9/242 |
| | | | | 285/12 |
| 6,991,262 | B1 | 1/2006 | Ragner | |
| 7,394,021 | B2 * | 7/2008 | Magno, Jr. | F16L 27/0841 |
| | | | | 174/59 |
| 2002/0011730 | A1 * | 1/2002 | Stickan | F16L 37/248 |
| | | | | 285/93 |
| 2008/0277919 | A1 * | 11/2008 | Valentini | F16L 27/0849 |
| | | | | 285/7 |
| 2014/0062084 | A1 * | 3/2014 | Breyer | F16L 37/248 |
| | | | | 285/402 |

FOREIGN PATENT DOCUMENTS

| | | |
|---|---|---|
| EP | 2 815 842 A1 | 12/2014 |
| EP | 2 902 155 A2 | 8/2015 |
| EP | 2 902 155 B1 | 11/2016 |
| EP | 4 454 821 A1 | 10/2024 |
| WO | 2005/034706 A2 | 4/2005 |
| WO | 2005/034706 A3 | 4/2005 |

OTHER PUBLICATIONS

KT 18 LTX 66 BL Set (691172840) Cordless Immersion Circular Saw, 18V, metaBox 340, FS 160, *KT 18 LTX 66 BL Set (691172840) Akku-Tauchkreissäge* Metabo, Cordless hand-held circular saws, 2025, 6 pages, with partial English translation.

* cited by examiner

CONNECTOR FOR COUPLING A PARTICLE OUTLET OF A HANDHELD MACHINE TOOL TO A PARTICLE RECEIVING DEVICE, HANDHELD MACHINE TOOL, HANDHELD MACHINE TOOL ASSEMBLY, AND METHOD

CROSS REFERENCE TO RELATED APPLICATIONS

This application claims the benefit of European Application No. 24171911.1, filed on Apr. 23, 2024, the contents of which are incorporated by reference in their entirety.

BACKGROUND

Field

The invention relates to a connector for coupling a particle outlet of a handheld machine tool to a particle receiving device. The connector comprises a tube-shaped inlet portion extending along an inlet axis and configured for coupling to the particle outlet of the handheld machine tool. Moreover, the connector comprises a connector-sided connection means configured for connecting the inlet portion to the particle outlet in an axially fixed and rotatable manner. The connector also comprises a tube-shaped outlet portion extending along an outlet axis and configured for coupling to the particle receiving device. Furthermore, the inlet portion comprises a body section and an engagement section, wherein the engagement section is resiliently coupled to the body section. The engagement section comprises an engagement geometry configured for mating with an engagement counter-geometry provided on the particle outlet, such that a positive locking effective along a circumferential direction is provided between the engagement geometry and the engagement counter-geometry. Using the resilient coupling, the engagement geometry and the engagement counter-geometry may mate at different predefined angular engagement positions.

The invention further is directed to a handheld machine tool. The handheld machine tool comprises a particle outlet connectable to a particle receiving device via such a connector.

AS:TOP

Moreover, the invention relates to a handheld machine tool assembly comprising such a connector and such a handheld machine tool.

Additionally, the present invention is directed to a method for operating a handheld machine tool assembly.

Description of Art

Such connectors and handheld machine tools are known. In this context, a connector may be used to couple a particle collection container to the handheld machine tool. Alternatively, the connector may be used to couple a tube or hose leading to a vacuum cleaner to the handheld machine tool. Due to the fact that, using the resilient coupling, the engagement geometry and the engagement counter-geometry may mate at different predefined angular engagement positions, such a connector may be used to selectively adjust a rotational position of its tube-shaped outlet portion with respect to the particle outlet of the handheld machine tool. To this end, the connector may be manually turned to with respect to the particle outlet of the handheld machine tool, thereby resiliently moving the engagement section with respect to the body section. Consequently, for such known connectors, a trade-off has to be found between an easy and simple adjustability of the angular position of the connector with respect to the particle outlet of the handheld machine tool and a reliable and secure positioning of the connector in a selected predefined angular engagement position. In other words, manually turning the connector needs to be possible on the one side and maintaining the chosen angular position needs to be ensured on the other side.

In cases in which a fixed angular position of the connector with respect to the particle outlet of the handheld machine tool is required, non-adjustable connectors may be used as an alternative. Such connectors are able to provide a particularly reliable and secure angular position of the connector with respect to the particle outlet of the handheld machine tool.

Thus, these two alternatives have complementary advantages and disadvantages, i.e. a non-adjustable connector does not allow to adjust an angular position of the connector with respect to the particle outlet of the handheld machine tool, but can ensure a reliable and secure angular position, whereas a connector providing angular adjustability needs to rely on a trade-off between easy adjustment and reliable positioning.

BRIEF SUMMARY

It is, thus, an objective of the present invention to provide an improved connector that at least partially combines the advantages of known connectors while not combining the associated shortcomings.

According to a first aspect of the invention, there is provided a connector for coupling a particle outlet of a handheld machine tool to a particle receiving device. The connector comprises a tube-shaped inlet portion extending along an inlet axis and configured for coupling to the particle outlet of the handheld machine tool. Moreover, the connector comprises a connector-sided connection means configured for connecting the inlet portion to the particle outlet in an axially fixed and rotatable manner. The connector also comprises a tube-shaped outlet portion extending along an outlet axis and configured for coupling to the particle receiving device. Furthermore, the inlet portion comprises a body section and an engagement section, wherein the engagement section is resiliently coupled to the body section. The engagement section comprises an engagement geometry configured for mating with an engagement counter-geometry provided on the particle outlet, such that a positive locking effective along a circumferential direction is provided between the engagement geometry and the engagement counter-geometry. Using the resilient coupling, the engagement geometry and the engagement counter-geometry may mate at different predefined angular engagement positions. Additionally, a locking means is coupled to the inlet portion. The locking means is configured for selectively blocking a movement of the engagement section relative to the body section.

Thus, the connector according to the invention may reliably couple the particle outlet of the handheld machine tool and the particle receiving device. At the same time, the connector allows to arrange the inlet portion of the connector at different predefined angular engagement positions with respect to the particle outlet of the handheld machine tool. These predefined angular engagement positions may be defined by the engagement geometry and the counter-engagement geometry, more precisely by a geometric shape of the engagement geometry and the counter-engagement geometry. In an example, both the engagement geometry and the counter-engagement geometry comprise one tooth or a plurality of teeth and the predefined angular engagement positions are defined by the tooth or teeth of the engagement geometry engaging the tooth or teeth of the counter-engagement geometry. To this end, the resilient coupling between the body section and the engagement section of the inlet portion is used in combination with the engagement geometry provided on the inlet portion and the engagement counter-geometry provided on the particle outlet of the handheld machine tool. In this context, using the resilient coupling means that an angular engagement position may be changed due to the fact that the engagement section may be resiliently moved relative to the body section. The angular engagement position may be adjusted easily in case the locking means does not block a movement of the engagement section relative to the body section, i.e. if the locking means is in a release position. If the locking means blocks a movement of the engagement section relative to the body section, i.e. if the locking means is in a locking position, also a relative movement of the engagement geometry and the engagement counter-geometry is blocked. Thus, an angular engagement position may not be changed. It is noted that the locking means may selectively assume the release position and the locking position. This means that a user of the connector may choose the position of the locking means. Thus, the connector of the present invention combines the advantage of simple and easy adjustability of an angular position of the connector relative to the particle outlet of the handheld machine tool and reliably securing a chosen angular position. It is noted that the locking means may be operated, i.e. switched from the locking position into the release position and vice versa, in a state in which it is mounted on the particle outlet of the handheld machine tool. This further facilitates the use of the connector.

A further advantage of the present invention relates to the fact that the locking means is provided on the connector. The connector can be selectively used in combination with any desired handheld machine tool and/or any desired particle receiving device. Put otherwise, the connector comprising the locking means can be used when the associated functionalities are needed. In a case in which the locking means would be provided on or at the particle outlet of the handheld machine tool, it would not be possible to use the handheld machine tool without the locking device. Thus, in some situations, the locking means would lead to undesired bulkiness of the handheld machine tool.

DETAILED DESCRIPTION

Figure 1:
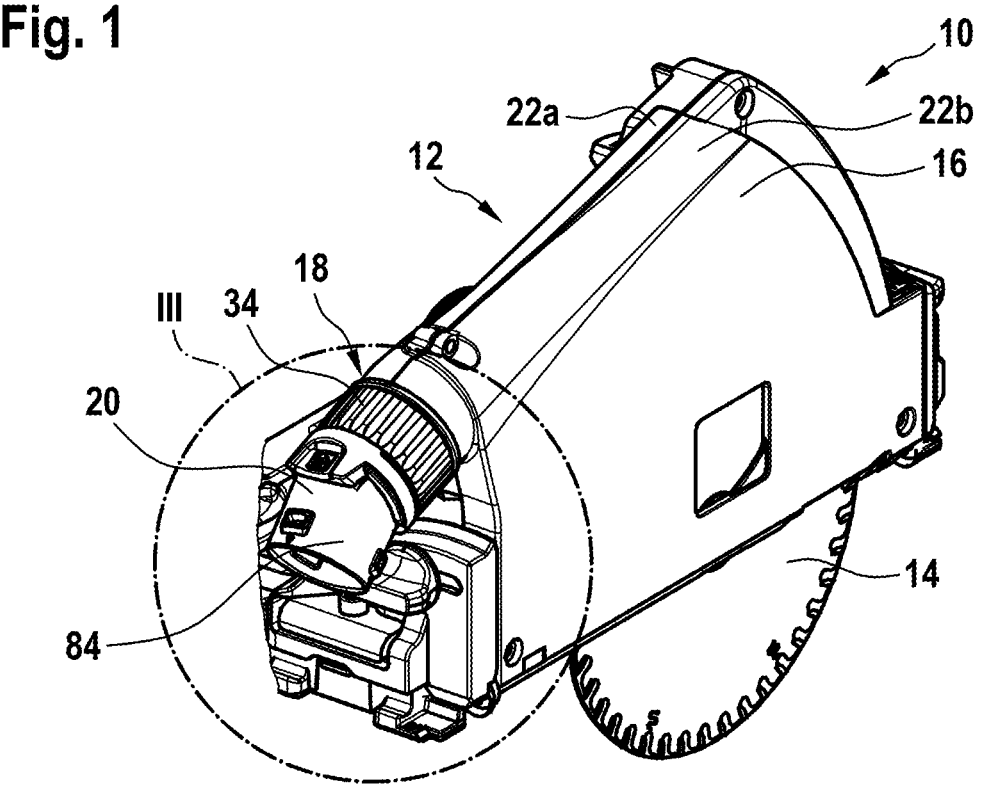
FIG. 1 shows a perspective view of handheld machine tool assembly according to the present invention comprising a handheld machine tool according to the present invention and a connector according to the present invention, wherein the handheld machine tool assembly may be operated using a method according to the present invention.

In the present context, positive locking or positive fit is understood as a configuration in which relative movement of two components is blocked through design details.

In a preferred case, the inlet portion extending along the inlet axis and the particle outlet extend coaxially if the inlet portion, i.e. the connector, is coupled to the particle outlet. In other cases it is also possible that the inlet portion and the particle outlet extend at an angle, i.e. the inlet axis and a middle axis of the particle outlet neither coincide nor are parallel.

According to an example, the inlet axis and the outlet axis of the connector enclose an angle which is larger than 0° and smaller than 180°. Preferably, the angle is larger than 90° and smaller than 180°. Consequently, the tube-shaped inlet portion and the tube-shaped outlet portion are arranged relative to one another at this angle. Currently, changing an angular position of the tube-shaped inlet portion with respect to the particle outlet of the handheld machine tool also acts on a spatial position and/or spatial orientation of the tube-shaped outlet portion. This position and/orientation may be chosen such that it is convenient for a current task to be performed with a handheld machine tool to which the connector is coupled. Consequently, also a position and/or orientation of a particle receiving device may be selectively chosen. Thus, in an example in which the particle receiving device is a hose or comprises a hose, an orientation of the hose may be adjusted such that the hose does not hinder the operation of the handheld machine tool to which the connector is coupled. The locking means may assume the release position while adjusting the orientation, such that the adjustment is simple. Moreover, the locking means may assume the locking position, once the orientation of the hose, i.e. the orientation of the connector, has been adjusted. Consequently, this orientation is maintained in a reliable manner. In doing so, an undesired interference of the particle receiving device, e.g. the hose, with a workpiece and/or other tools may be reliably avoided.

According to an example, the engagement geometry of the engagement section of the inlet portion may comprise one tooth or a plurality of teeth. Accordingly, the engagement counter-geometry provided on the particle outlet may comprise one tooth or a plurality of teeth. The tooth or teeth of the particle outlet are configured to mate with the tooth or teeth of the inlet portion. According to a variant, the tooth or teeth of the particle outlet extent in an axial direction. In the same manner, the tooth or teeth of the inlet portion also extend axially. In a special case, the engagement counter-geometry comprises a plurality of teeth which cover substantial the entire circumference of the particle outlet and extend axially. In this case, it is sufficient that the engagement geometry of the inlet portion comprises one single tooth. It is also possible that the engagement geometry comprises two or more teeth. According to another variant, the tooth or teeth of the particle outlet extend in a radial direction. In the same manner, the tooth or teeth of the inlet portion also extend radially. In a special case, the engagement counter-geometry comprises a plurality of teeth which cover substantially an entire circumference of the particle outlet and extend radially. In this case, it is sufficient that the engagement geometry of the inlet portion comprises one single tooth. It is also possible that the engagement geometry comprises two or more teeth.

In the context of the present invention, a particle receiving device is a device configured for receiving and/or collecting particles resulting from an operation of the handheld machine tool. The particles may be particles of a workpiece which is machined using the handheld machine tool, e.g. chips, sawdust, debris, etc. A s has been mentioned before, the particle receiving device may be a particle collection container or a tube or hose leading to a vacuum cleaner.

In an example, the locking means comprises a blocking element selectively arrangeable between the engagement section and the body section. This is a simple and reliable way for blocking a movement of the engagement section relative to the body section. Furthermore, in this configuration, the locking means is configured to withstand comparatively high mechanical forces and torques, i.e. this configuration is mechanically robust.

The locking means may comprise a ring-shaped carrier element at least partially extending circumferentially around the inlet portion. The blocking element may extend from the carrier element in a radially inward direction. Using a ring-shaped carrier element allows to reliably support and move the blocking element. Additionally, such a ring-shaped carrier element is well-suitable for being operated manually by a user of the connector. Moreover, this configuration is structurally simple.

In an example, the ring-shaped carrier element is rotatably supported on the inlet portion, wherein a corresponding axis of rotation coincides with the inlet axis or extends in parallel to the inlet axis. In the latter case, the inlet axis and the axis of rotation may be arranged at a distance larger than zero. In case the axis of rotation coincides with the inlet axis, the ring-shaped carrier may be rotated along a circumference of the inlet portion. In this context, a first relative position of the ring-shaped carrier to which the blocking element is connected, may be associated with a release position of the locking means. A second relative position of the ring-shaped carrier to which the blocking element is connected may be associated with a blocking position of the locking means. The first relative position and the second relative position are different. Consequently, in this variant, the ring-shaped carrier needs to be rotated along the circumference of the inlet portion in order to switch the locking means from the release position into the locking position and vice versa. Thus, for example, the blocking element may be moved into a position between the engagement section and the body section along a circumferential direction of the inlet portion. Moreover, the blocking element may be withdrawn from a position between the engagement section and the body section along a circumferential direction of the inlet portion. This is comparatively simple and may be easily performed manually at the same time, a probability that the carrier element is unintentionally moved while operating the handheld machine tool to which the connector is coupled, it is comparatively low. In case the axis of rotation of the carrier element extends in parallel to the inlet axis, the carrier element may be able to rock with respect to the inlet portion. In other words, the carrier element may be formed as a rocker or rocker lever. Also in this context, a first relative position of the carrier to which the blocking element is connected, may be associated with a release position of the locking means. A second relative position of the carrier to which the blocking element is connected may be associated with a blocking position of the locking means. The first relative position and the second relative position are different. Consequently, in this variant, the carrier needs to be rotated relative to the inlet portion in order to switch the locking means from the release position into the locking position and vice versa. Thus, for example, the blocking element may be moved into a position between the engagement section and the body section along a radial direction of the inlet portion. Moreover, the blocking element may be withdrawn from a position between the engagement section and the body section along a radial direction of the inlet portion. This is comparatively simple and may be easily performed manually at the same time, a probability that the carrier element is unintentionally moved while operating the handheld machine tool to which the connector is coupled, it is comparatively low.

According to an embodiment, the blocking element comprises an abutment surface and the body section or the engagement section comprises a counter-abutment surface. The abutment surface and the counter-abutment surface may be arranged adjacent to one another at least in a situation in which the locking means is blocking a movement of the engagement section relative to the body section. The abutment surface and/or the counter-abutment surface may be inclined when regarded along a circumferential direction. Providing the abutment surface and the corresponding counter-abutment surface allows to reliably block the movement of the engagement section relative to the body section. The fact that the abutment surface and/or the counter-abutment surface is inclined when regarded along a circumferential direction means that a normal on the abutment surface and/or the counter abutment surface has a component extending in the radial direction and a component extending in the axial direction. Thus, in a case in which an axial force is applied on the abutment surface and/or the counter-abutment surface, the blocking element and/or the body section may experience a radial force. In this context, the radial force may be oriented in the direction outwards from a locking position of the blocking element. This configuration may be used as an overload protection for the locking means. This means that in case of overload, especially axial overload, the blocking element may be pushed out of the blocking position, preferably radially outwards. Consequently, in a situation of overload, damage of the connector is avoided or at least reduced.

The locking means may comprise a locking lever rotatably supported on the body section such that the locking lever is rotatable around a lever axis. The locking lever comprises a blocking surface which may be selectively arranged adjacent to the engagement section by rotating the locking lever. This means that in a first rotational position of the locking lever, the blocking surface may be arranged at a distance of the engagement section. This first rotational position may be associated with a release position of the locking means. In a second rotational position of the locking lever, the blocking surface may be arranged adjacent to the engagement section. In this context, the blocking surface may as well contact the engagement section fully or partially. Thereby, the blocking surface blocks a relative movement of the engagement section relative to the body section. The second rotational position of the locking lever may be associated with the locking position of the locking means. The first rotational position and the second rotational position are different. This is another simple and reliable way to provide a locking functionality.

According to an example, the blocking surface is at least partially eccentric with respect to the lever axis. Thus, by rotating the locking lever, the blocking surface may be simply and reliably moved from a position adjacent to the engagement section into a position at a distance from the engagement section and vice versa. Thus, this configuration is particularly simple and reliable. The lever axis may extend radially on the body section. This means that the locking lever needs to be rotated around a radial direction of the body section for switching the locking means between the locking position and the release position. This is structurally simple. Moreover, a probability that the locking lever is unintentionally moved while operating the handheld machine tool to which the connector is coupled, it is comparatively low.

In an embodiment, the connector further comprises an indicator means, indicating whether the locking means is blocking a movement of the engagement section relative to the body section or allowing a movement of the engagement section relative to the body section. In other words, the indicator means indicates whether the locking means is in the locking position or in the release position. This facilitates the use of the connector since a user may easily know whether the locking means is blocking a movement of the engagement section relative to the body section or not.

In an example, the connector-sided connection means comprises a connection ring rotatable with respect to the inlet portion around a ring axis coinciding with the inlet axis. Additionally, the connection ring is axially fixed with respect to the inlet portion. The connection ring may comprise a screwing means and/or bayonet means for connecting the inlet portion to the particle outlet. Consequently, the connector may be reliably connected to the particle outlet.

According to a second aspect of the invention, there is provided a connector comprising a connector-sided abutment means configured for limiting a rotation of the inlet portion with respect to the particle outlet. The connector-sided abutment means is separate from the engagement section and from the locking means. The connector-sided abutment means is configured to interact with a machine-sided abutment means. Consequently, a rotation of the inlet portion with respect to the particle outlet may be limited to a predefined angular interval. This has the effect that possible positions and orientations of the outlet portion of the connector and possible positions and orientations of a particle receiving device connected thereto are also limited. This is advantageous if an undesired interference of the particle receiving device, e.g., a hose connected to a vacuum cleaner, with certain portions of the handheld machine tool and/or the workpiece and/or other tools shall be reliably avoided. This enhanced operational safety and quality of the work result.

According to an example, the connector sided abutment means comprises a bar-shaped protrusion extending axially from the inlet portion, e.g. the body section of the inlet portion. This bar-shaped protrusion may be configured to abut against blocking elements provided at the inner circumference of the particle outlet. Alternatively, the bar-shaped protrusion may be configured to be located in an associated recess on the particle outlet. Consequently, the angular interval by which the connector may rotate relative to the particle outlet may be defined by the bar-shaped protrusion's moving range between the blocking elements provided at the inner circumference of the particle outlet or within the recess on the particle outlet. Of course, a cinematically inverted solution is also possible, i.e. the bar-shaped protrusion may be provided on the particle outlet and the blocking element or the recess may be provided on the inlet portion of the connector.

According to another example, a rotation of the inlet portion with respect to the particle outlet may be allowed over an angular interval of 270°. In other words, an angular interval of 90° is not accessible for the inlet portion, i.e. the connector. In an example, a rotation of the inlet portion with respect to the particle outlet may be allowed between −60 degrees and +210 degrees, wherein a top position is defined as 0 degrees. In other words, 0 degrees corresponds to 12 o'clock and the inlet portion may rotate between an angular position corresponding to 10 o'clock, i.e. −60 degrees, and an angular position corresponding to 7 o'clock, i.e. 210 degrees. Angular positions between 7 o'clock and 10 o'clock are not accessible. The same may be described with a lower position defined as 0 degrees. In this case, 0 degrees corresponds to 6 o'clock and a rotation of the inlet portion with respect to the particle outlet may be allowed between −30 degrees and +240 degrees, wherein the position at -30 degrees corresponds to 7 o'clock and the position at +240 degrees corresponds to 10 o'clock.

It is noted that the connector according to the second aspect of the invention may be a connector according to the introductory portion of the present document or according to the first aspect of the invention. However, the latter case is optional. This means that the connector according to the second aspect may comprise the connector-sided abutment means but no locking means.

Alternatively, the connector according to the second aspect may comprise both the connector-sided abutment means and the locking means.

According to a third aspect of the present invention, there is provided a handheld machine tool. The handheld machine tool comprises a particle outlet connectable to a particle receiving device via a connector according to the present invention. The particle outlet is tube-shaped and extends along a machine outlet axis. The particle outlet comprises an axial abutment feature configured to abut axially against the connector. Moreover, the particle outlet comprises a machine-sided connection means configured for coupling with the connector-sided connection means, and an engagement counter-geometry configured to mate with an engagement geometry provided on the connector. Thus, such a handheld machine tool, especially the particle outlet of such a handheld machine tool, is configured to interact with a connector according to the present invention. Thus, the connector according to the invention may be reliably coupled to the particle outlet of the handheld machine tool. Thereby, a particle receiving device may be reliably coupled to the handheld machine tool. At the same time, the inlet portion of the connector may be arranged at different predefined angular engagement positions with respect to the particle outlet of the handheld machine tool.

In a preferred case, the inlet portion extending along the inlet axis and the particle outlet extend coaxially if the inlet portion, i.e. the connector, is coupled to the particle outlet. In other cases it is also possible that the inlet portion and the particle outlet extend at an angle, i.e. the inlet axis and the outlet axis of the particle outlet neither coincide nor are parallel.

According to an example, the engagement counter-geometry provided on the particle outlet may comprise one tooth or a plurality of teeth. The tooth or teeth of the particle outlet are configured to mate with the tooth or teeth of the inlet portion. Accordingly, the engagement geometry of the engagement section of the inlet portion may comprise one tooth or a plurality of teeth. According to a variant, the tooth or teeth of the particle outlet extend in an axial direction. In the same manner, the tooth or teeth of the inlet portion also extend axially. In a special case, the engagement counter-geometry comprises a plurality of teeth which cover substantial the entire circumference of the particle outlet and extend axially. In this case, it is sufficient that the engagement geometry of the inlet portion comprises one single tooth. It is also possible that the engagement geometry comprises two or more teeth. According to another variant, the tooth or teeth of the particle outlet extend in a radial direction. In the same manner, the tooth or teeth of the inlet portion also extend radially. In a special case, the engagement counter-geometry comprises a plurality of teeth which cover substantially an entire circumference of the particle outlet and extend radially. In this case, it is sufficient that the engagement geometry of the inlet portion comprises one single tooth. It is also possible that the engagement geometry comprises two or more teeth.

The particle outlet may further comprise a machine-sided abutment means configured for limiting a rotation of the connector with respect to the particle outlet. Consequently, a rotation of the inlet portion with respect to the particle outlet may be limited to a predefined angular interval. This has the effect that possible positions and orientations of the outlet portion of the connector and possible positions and orientations of a particle receiving device connected thereto are also limited. This is advantageous if an undesired interference of the particle receiving device, e.g., a hose connected to a vacuum cleaner, with certain portions of the handheld machine tool and/or the workpiece and/or other tools shall be reliably avoided. This enhanced operational safety and quality of the work result.

According to an example, the connector sided abutment means comprises a bar-shaped protrusion extending axially from the inlet portion, e.g. the body section of the inlet portion. This bar-shaped protrusion may be configured to abut against blocking elements provided at the inner circumference of the particle outlet. Alternatively, the bar-shaped protrusion may be configured to be located in an associated recess on the particle outlet. Consequently, the angular interval by which the connector may rotate relative to the particle outlet may be defined by the bar-shaped protrusion's moving range between the blocking elements provided at the inner circumference of the particle outlet or within the recess on the particle outlet. Of course, a cinematically inverted solution is also possible, i.e. the bar-shaped protrusion may be provided on the particle outlet and the blocking element or the recess may be provided on the inlet portion of the connector.

According to another example, a rotation of the inlet portion with respect to the particle outlet may be allowed over an angular interval of 270°. In other words, an angular interval of 90° is not accessible for the inlet portion, i.e. the connector. In an example, a rotation of the inlet portion with respect to the particle outlet may be allowed between −60 degrees and +210 degrees, wherein a top position is defined as 0 degrees. In other words, 0 degrees corresponds to 12 o'clock and the inlet portion may rotate between an angular position corresponding to 10 o'clock, i.e. −60 degrees, and an angular position corresponding to 7 o'clock, i.e. 210 degrees. Angular positions between 7 o'clock and 10 o'clock are not accessible. The same may be described with a lower position defined as 0 degrees. In this case, 0 degrees corresponds to 6 o'clock and a rotation of the inlet portion with respect to the particle outlet may be allowed between −30 degrees and +240 degrees, wherein the position at −30 degrees corresponds to 7 o'clock and the position at +240 degrees corresponds to 10 o'clock.

According to a variant, the machine-sided abutment means may also serve as a bayonet connection interface or screwing connection interface, e.g. for connecting a hose or any other particle receiving device to the particle outlet.

According to a fourth aspect of the present invention, there is provided a handheld machine tool assembly comprising a connector according to the present invention, and a handheld machine tool according to the present invention, wherein the connector is coupled to the particle outlet of the handheld machine tool. Thus, the connector according to the invention may reliably couple the particle outlet of the handheld machine tool and a particle receiving device. At the same time, the connector allows to arrange the inlet portion of the connector at different predefined angular engagement positions with respect to the particle outlet of the handheld machine tool. To this end, the resilient coupling between the body section and the engagement section of the inlet portion is used in combination with the engagement geometry provided on the inlet portion and the engagement counter-geometry provided on the particle outlet of the handheld machine tool. The angular engagement position may be adjusted easily in case the locking means does not block a movement of the engagement section relative to the body section, i.e. if the locking means is in a release position. If the locking means blocks a movement of the engagement section relative to the body section, i.e. if the locking means is in a locking position, a relative movement of the engagement geometry and the engagement counter-geometry is blocked. Thus, an angular engagement position may not be changed. It is noted that the locking means may selectively assume the release position and the locking position. This means that a user of the handheld machine tool assembly may choose the position of the locking means. Thus, the handheld machine tool assembly of the present invention combines the advantage of simple and easy adjustability of an angular position of the connector relative to the particle outlet of the handheld machine tool and reliably securing a chosen angular position. It is noted that the locking means may be operated, i.e. switched from the locking position into the release position and vice versa, in a state in which the connector is mounted on the particle outlet of the handheld machine tool. This further facilitates the use of the connector.

In an example, the handheld machine tool assembly further comprises a particle receiving device coupled to the outlet portion of the connector. As has been mentioned before, each device configured for receiving and/or collecting particles resulting from an operation of the handheld machine tool is a particle receiving device. The particles may be particles of a workpiece which is machined using the handheld machine tool. As has been mentioned before, the particle receiving device may be a particle collection container or a tube or hose leading to a vacuum cleaner.

According to a fifth aspect of the present invention, there is provided a method for operating a handheld machine tool assembly. The handheld machine tool assembly comprises a handheld machine tool having a particle outlet and a connector for coupling the particle outlet of the handheld machine tool to a particle receiving device. The connector is coupled to the particle outlet of the machine tool. The method comprises:

selecting an angular engagement position of the connector with respect to the particle outlet, wherein the angular engagement position is selected out of a plurality of predefined angular engagement positions by turning the connector with respect to the particle outlet, especially wherein the plurality of predefined angular positions are restraint to a predefined interval of angular engagement positions, and blocking a further rotation of the connector with respect to the particle outlet.

Thus, the connector may reliably couple the particle outlet of the handheld machine tool and the particle receiving device. At the same time, the method allows to arrange the inlet portion of the connector at different predefined angular engagement positions with respect to the particle outlet of the handheld machine tool. The angular engagement position may be adjusted easily in case the further rotation is not blocked, e.g. by a locking means. If the further rotation is blocked, an angular engagement position may not be changed. Also to this end a locking means may be used which then is in a locking position. Thus, using the present method, an angular position of the connector with respect to the particle outlet may be simply and easily adjusted and, additionally, reliably secured in a chosen angular position. It is noted that the steps of the method according to the present invention may be executed in a state in which the connector is mounted on the particle outlet of the handheld machine tool. This further facilitates the use of the handheld machine tool assembly.

According to an option, the plurality of predefined angular positions are restraint to a predefined interval of angular engagement positions. Consequently, a rotation of the inlet portion with respect to the particle outlet may be limited to a predefined angular interval. This has the effect that possible positions and orientations of the outlet portion of the connector and possible positions and orientations of a particle receiving device connected thereto are also limited. This is advantageous if an undesired interference of the particle receiving device, e.g., a hose connected to a vacuum cleaner, with certain portions of the handheld machine tool and/or the workpiece and/or other tools shall be reliably avoided. This enhanced operational safety and quality of the work result.

It is noted that the examples, effects and advantages which are mentioned in connection with one aspect of the invention always apply mutatis mutandis to all other aspects of the invention.

These and other aspects of the present invention will become apparent from and elucidated with reference to the examples described hereinafter. Examples of the invention will be described with reference to the drawings.

Figure 2:
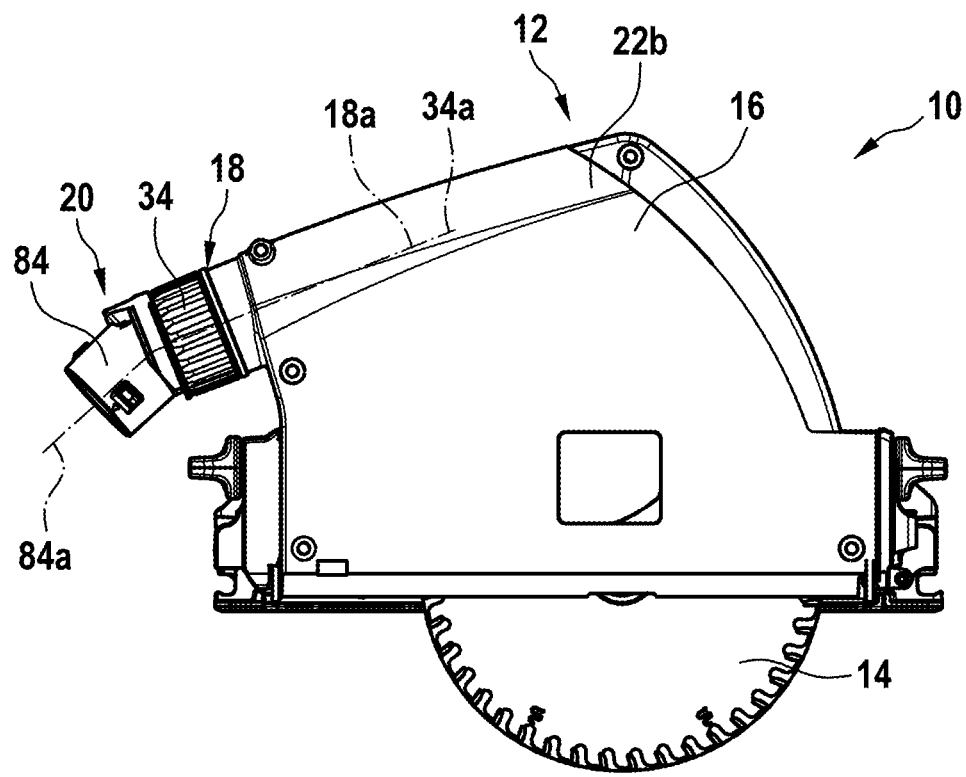
FIG. 2 shows the handheld machine tool assembly of FIG. 1 in a side view.
Figure 3:
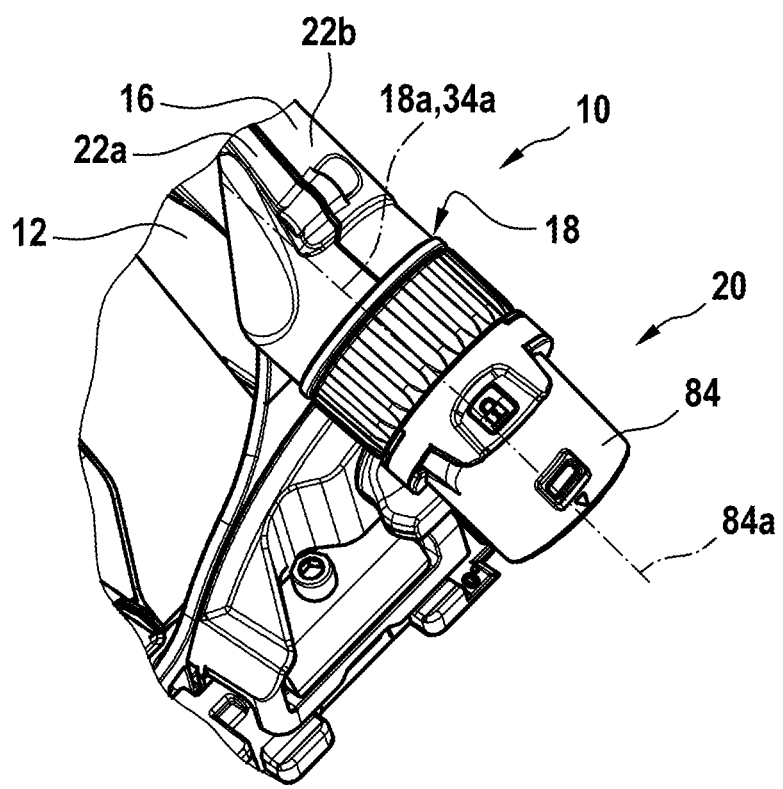
FIG. 3 shows a detail view III of the handheld machine tool assembly of FIG. 1.

FIGS. 1 to 3 show a handheld machine tool assembly 10. The handheld machine tool assembly 10 comprises a handheld machine tool 12 which in the present example is a plunge cut saw.

The handheld machine tool 12 comprises a circular saw blade 14 which is rotatably supported on a frame of the handheld machine tool 12. Moreover, a portion of the circular saw blade 14 is covered by a housing 16 of the handheld machine tool 12.

Among other things, the housing 16 fulfills to functions. A first function relates to covering the portion of the circular saw blade 14 such that a contact between a user of the handheld machine tool 12 and the saw blade 14 is prevented.

The second function relates to guiding particles, more precisely workpiece particles, resulting from cutting a workpiece using the handheld machine tool 12. On the housing 16, there is provided a particle outlet 18 and during operation of the handheld machine tool 12, particles are guided towards the particle outlet 18.

Different particle receiving devices may be coupled to the particle outlet 18 such that the particles may be received in this particle receiving device in a controlled manner, i.e. particles are collected in the particle receiving device instead of being distributed in the environment of the handheld machine tool 12. Examples of particle receiving devices include particle collection containers and tubes or hoses leading to vacuum cleaners.

However, in the present example, the particle receiving device may not be coupled directly to the particle outlet 18 of the handheld machine tool 12. Instead, the handheld machine tool assembly 10 comprises a connector 20 for coupling the particle outlet 18 of the handheld machine tool 12 to the particle receiving device. Thus, the particle receiving device may be coupled to the particle outlet 18 via the connector 20.

In the example of FIGS. 1 and 2, the connector 20 is coupled to the particle outlet 18 of the handheld machine tool 12. A particle receiving device is not shown for reasons of better visibility of the remaining components of the handheld machine tool assembly 10.

Figure 4:
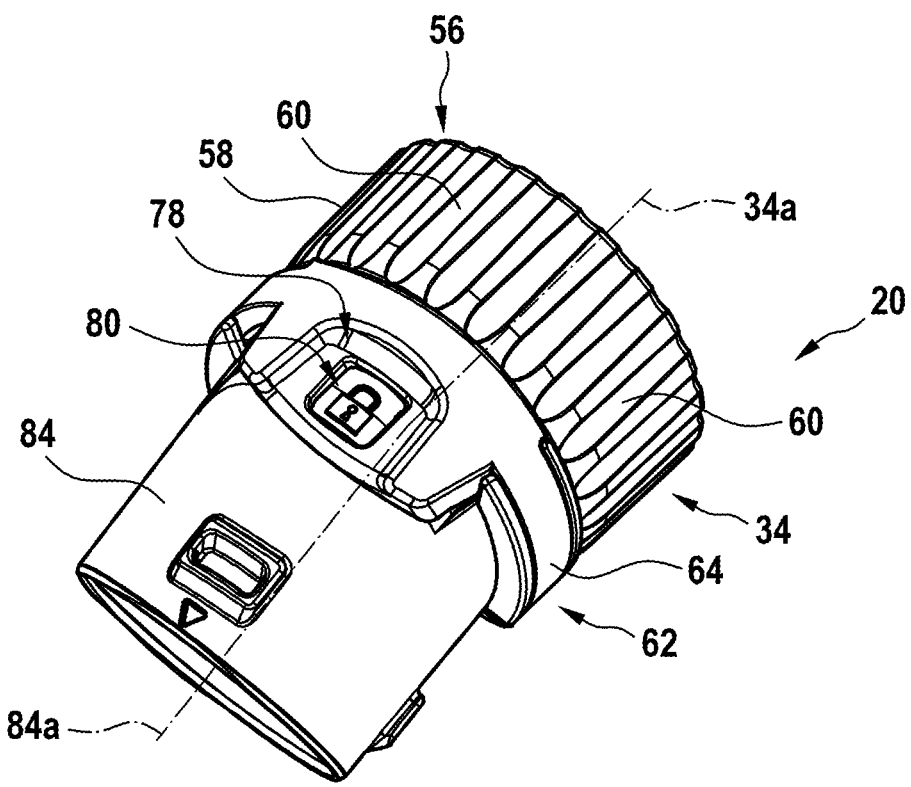
FIG. 4 shows a perspective view of the connector of FIGS. 1 to 3, wherein the connector is represented alone.

It is emphasized that the connector 20 is a part separate from the handheld machine tool 12. This means that the connector 20 is not a component of the handheld machine tool 12 but may be coupled to the handheld machine tool 12 if desired (see also FIG. 4).

The particle outlet 18 of the handheld machine tool 12 is tube-shaped and extends along a machine outlet axis 18a. The machine outlet axis 18a substantially coincides with a middle axis of the tube-shaped particle outlet 18 (see especially FIG. 5).

In the example shown in the Figures, the particle outlet 18 is formed as a part which, in an assembled state of the handheld machine tool 12, is arranged between two housing shells 22a, 22b. However, it is also possible to have the particle outlet 18 formed as an integral part of the housing shells 22a, 22b or any other part of the housing 16. In any case, the particle outlet 18 is a part of the handheld machine tool 12, i.e. the particle outlet 18 is fixedly connected to the remaining parts of the handheld machine tool 12.

On its outer circumference, the particle outlet 18 comprises a machine-sided connection means 24 configured for coupling with a connector-sided connection means of the connector 20, which will be described in more detail further below.

In the present example, the machine-sided connection means 24 comprises a plurality of protrusions 26 arranged on an outer circumference of the particle outlet 18. This means that each of the protrusions 26 has a height that extends substantially in a radial direction of the particle outlet 18. A length of each of the protrusions 26 extends substantially along a circumferential direction of the particle outlet 18. A width of each of the protrusions 26 extends substantially along an axial direction of the particle outlet 18.

The protrusions 26 are spaced from one another along the circumferential direction of the particle outlet 18. Furthermore, all of the protrusions 26 are arranged on a common circumference of the particle outlet 18. This means that all of the protrusions have essentially the same axial position.

In the present example, all protrusions 26 are shaped identically.

Altogether, the protrusions 26 form a bayonet-type connection interface.

Furthermore, the protrusions 26 are wedge-shaped with respect to their width. This means that a width of the protrusions 26 is not constant along a circumferential direction of the particle outlet 18, but varies continuously. In the present example, the width of the protrusions 26 varies linearly. This allows for axially abutting the connector 20 against the particle outlet 18 with particular reliability.

The particle outlet 18 also comprises an axial abutment feature configured to abut axially against the connector 20. In the present example, the axial abutment feature 28 is formed by an end face 30 of the tube-shaped particle outlet 18 which faces away from the remaining components of the handheld machine tool 12. This end face 30 is ring-shaped.

Moreover, the end face 30 is toothed. This means that a plurality of teeth 32 is arranged on the end face 30. In the present example, these teeth 32 all point in an axial direction.

In the present example, the end face 30 is entirely covered with teeth 32.

The connector 20 comprises a tube-shaped inlet portion 34 which extends along an inlet axis 34*a*.

The tube-shaped inlet portion 34 is configured for coupling to the particle outlet 18 of the handheld machine tool 12.

To this end, an end face 36 of the tube-shaped inlet portion 34 is configured to abut against the end face 30 of the particle outlet 18.

Figure 5:
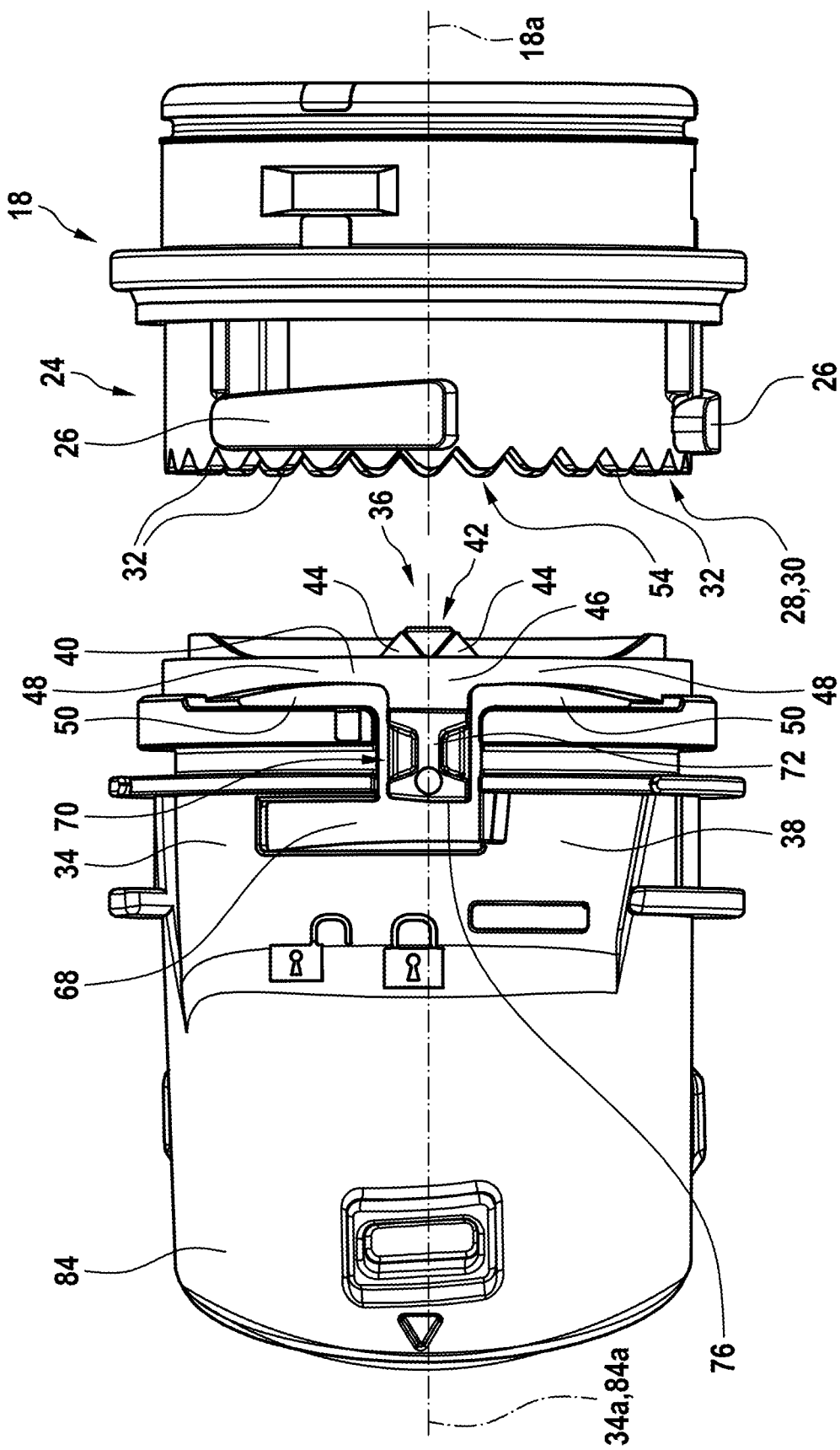
FIG. 5 shows selected parts of the connector of FIG. 4 and a particle outlet of the handheld machine tool in a separated condition.
Figure 6:
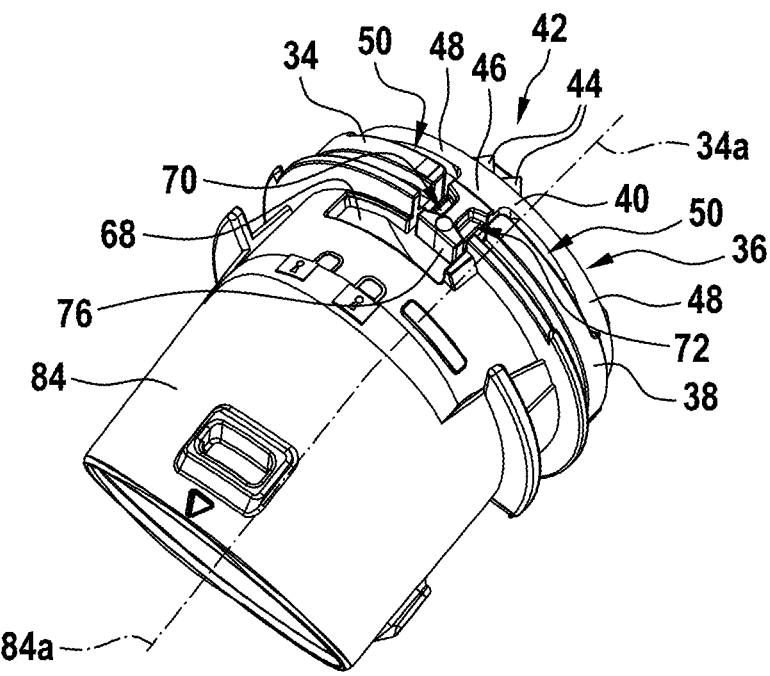
FIG. 6 shows the selected parts of the connector of FIG. 5 in a perspective view.
Figure 7:
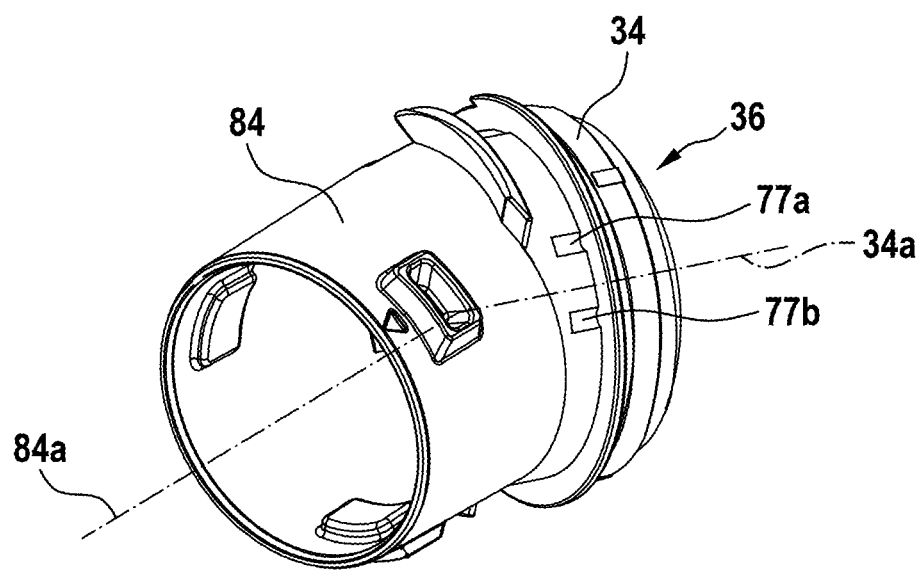
FIG. 7 shows the selected parts of the connector of FIG. 6 from a different perspective.
Figure 8:
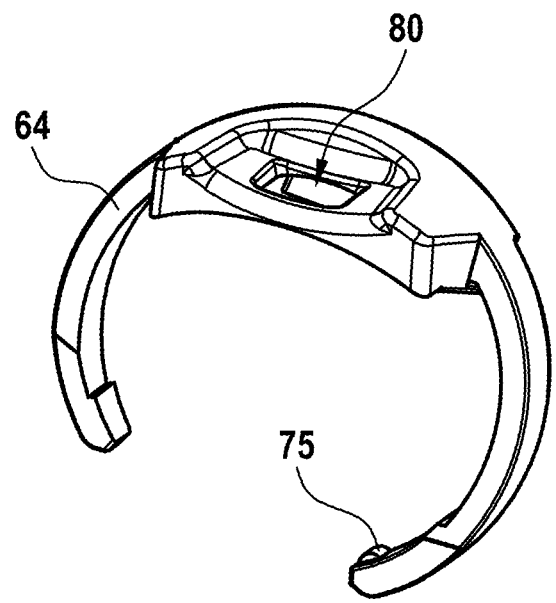
FIG. 8 shows a ring-shaped carrier element of the connector of FIG. 4 in a separate, perspective view.
Figure 9:
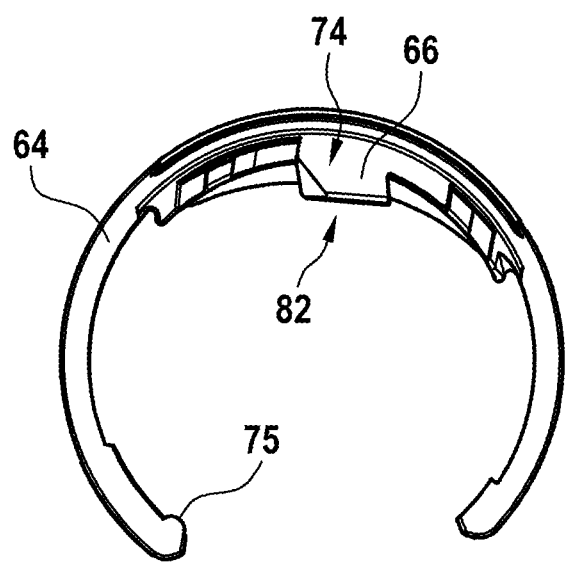
FIG. 9 shows the ring-shaped carrier element of FIG. 8 in a side view, FIG. 10 show a connector according to a different embodiment of the present invention, wherein a locking means of the connector is in a release position.

More precisely, the inlet portion 34 comprises a body section 38 and an engagement section 40 wherein the end face 36 is partially formed by the body section 38 and partially formed by the engagement section 40 (cf. FIGS. 5 to 7).

The engagement section 40 is resiliently coupled to the body section 38 and comprises an engagement geometry 42.

In the present example, the engagement geometry 42 comprises a pair of teeth 44. These teeth 44 point into an axial direction, i.e. along the inlet axis 34*a* in a direction away from the remaining components of the inlet portion 34.

The pair of teeth 44 is supported on a support portion 46 of the engagement section 40.

This support portion 46 is connected to the body section 38 via two resilient arms 48.

These resilient arms 48 are arranged on opposite circumferential sides of the support portion 46 and extend substantially along the circumferential direction of the inlet portion 34.

A gap 50 is provided between each of the resilient arms 48 and neighboring portions of the body section 38 such that each of the resilient arms 48 is able to move along an axial direction of the inlet portion 34. Thereby, the support portion 46 carrying the engagement geometry 42, i.e. the pair of teeth 44, is also resiliently movable in an axial direction of the inlet portion 34.

The pair of teeth 44 is configured for mating with the teeth 32 of the particle outlet 18 if the inlet portion 34 axially abuts against the particle outlet 18.

In such a situation, i.e. if the pair of teeth 44 mates with the teeth 32 of the particle outlet 18, a positive locking effective along a circumferential direction of both the inlet portion 34 and the particle outlet 18 is created.

In this context, the teeth 32 and the teeth 44 define a plurality of predefined angular engagement positions, i.e. a plurality of relative angular positions that the inlet portion 34 and the particle outlet 18 may assume with respect to one another.

Moreover, using the resilient coupling of the engagement section 40 and the body section 38 of the inlet portion, an angular relative position of the inlet portion 34 with respect to the particle outlet 18 may be adjusted.

In simplified words, the inlet portion 34 may be rotated relative to the particle outlet 18 while the inlet portion 34 and the particle outlet 18 axially abut against one another. The relative rotation in combination with the resilient coupling of the engagement section 40 and the body section 38 allow the pair of teeth 44 to be drawn over one or more of the teeth 32 i.e. to change the teeth 32 with which they are mating.

In this context, the pair of teeth 44 may also be called an engagement geometry 42 and the teeth 32 may be called an engagement counter-geometry 54.

The connector 20 also comprises a connector-sided connection means 56 configured for connecting the inlet portion 34 to the particle outlet 18 in an axially fixed and rotatable manner. In the present example, the connector-sided connection means 56 comprises a connection ring 58.

The connection ring 58 is rotatably supported on the inlet portion 34 such that the connection ring is rotatable around a ring axis coinciding with the inlet axis 34*a*.

The connection ring 58 is axially fixed with respect to the inlet portion 34.

Furthermore, the connection ring 58 partially extends over the inlet portion 34 in an axial direction.

The connection ring 58 comprises a plurality of protrusion on the portion of its inner circumference extending over the inlet portion 34. This means that the protrusions of the connection ring 58 extends radially inwards.

The connector-sided connection means 56 is configured to engage the machine-sided connection means 24.

Thus, the protrusions of the connection ring 58 may be axially move between the protrusions 26 of the machine-sided connection means 24 such that the protrusions of the connection ring 58 may be arranged on an axial side of the protrusions 26 that is located opposite the inlet portion 34. In this state, the connection ring 58 may be rotated such that the protrusions of the connection ring 58 may be circumferentially moved until they reach a position axially adjacent to a corresponding one of the protrusions 26 of the machine-sided connection means 24.

In this context, the connection ring 58 may be rotated manually. In order to facilitate gripping of the connection ring 58, an outer circumference of the connection ring 58 is covered with a plurality of ribs 60.

Thus, in such a condition, the connector 20 is coupled to the particle outlet 18 in an axially fixed but rotatable manner.

As has been mentioned before, the protrusions 26 form a bayonet-type connection interface.

Consequently, the protrusions of the connection ring 58 may also be called bayonet means. Additionally or alternatively, due to the fact that the connection ring 58 is rotated for coupling the connector 22 the particle outlet 18, the protrusions of the connection ring 58 may as well be called screwing means.

The fact that the protrusions 26 are wedge shaped has the effect that the connector 20 is firmly abutted against the particle outlet 18 along an axial direction.

The connector also comprises a locking means 62.

The locking means 62 is configured for selectively blocking a movement of the engagement section 40 relative to the body section 38.

The locking means 62 is coupled to the inlet portion 34.

In the present example, the locking means 62 comprises a ring-shaped carrier element 64 that may extend circumferentially around a portion of the inlet portion 34. To this end, the ring-shaped carrier element 64 is shaped as a partial ring which covers an angle of approximately 300°. In other words, the ring shape of the ring-shaped carrier element 64 is interrupted over an angle of approximately 60°.

The carrier element 64 is made from a resilient material, e.g. plastics material, such that due to the partial ring-shape and the resilience, the carrier element 64 may be clipped on the inlet portion 34 by pushing the carrier element 64 onto the inlet portion 34 along a radial direction of the inlet portion 34.

In this position, the ring-shaped carrier element 64 is rotatably supported on the inlet portion 34. An axis of rotation of the ring-shaped carrier element 64 coincides with the inlet axis 34a.

Moreover, a blocking element 66 is arranged on the carrier element 64.

More precisely, the blocking element 66 is formed as a plate-shaped or tab-shaped protrusion on an inner circumference of the carrier element 64. In other words, the blocking element 66 extends from the carrier element 64 in a radially inward direction.

The blocking element 66 is received in a slot 68 extending along a circumferential direction of the inlet portion 34.

In this context, a length of the slot 68 along the circumferential direction corresponds to at least twice a length of the blocking element 66 along the circumferential direction. Consequently, the blocking element 66 is movable within the slot 68. This movement is associated with a rotation of the carrier element 64 along a circumference of the inlet portion 34.

The slot 68 is not fully closed, but mates with a guiding slot 70 for the engagement section 40 of the inlet portion 34. The guiding slot 70 extends substantially along an axial direction of the inlet portion 34. Thereby, a circumferential width of the guiding slot 70 corresponds to half the circumferential length of the slot 68 or less.

Moreover, the slot 68 and the guiding slot 70 mate such that when regarding the slot 68 and the guiding slot 70 along a radial direction, they form an L-shape. This means that the guiding slot 70 mates with the slot 68 at a circumferential end of the slot 68.

Additionally, a guiding portion 72 of the engagement section 40 is received in the guiding slot 70. The guiding portion 72 is connected to the support portion 46 of the engagement section. More precisely, the guiding portion 72 and the support portion 46 are arranged axially adjacent to one another. Thus, the guiding portion 72 and the resilient arms 48 form a T-shape when regarded along a radial direction.

In a non-biased state of the resilient arms 48, the guiding portion 72 is arranged in the guiding slot 70 only, i.e. does not extend into the slot 68.

The locking means 62 may assume a locking position and a release position.

The locking means 62 may be manually switched between these positions by rotating the carrier element 64 along an outer circumference of the inlet portion 34.

In case the locking means 62 assumes the release position, the blocking element 66 is arranged in a portion of the slot 68 which does not comprise a connection to the guiding slot 70. In a preferred case, the blocking element 66 is arranged at an end of the slot 68 which is arranged opposite to the end at which the guiding slot 70 and the slot 68 mate.

Consequently, the guiding portion 72 is free to move into the portion of the slot 68 which is not occupied by the blocking element 66, in case the resilient arms 48 are resiliently deformed in an axial direction. Thus, if the locking means 62 is in the release position, the above-described functionality of turning the inlet portion 34 relative to the particle outlet 18 may be applied such that the predefined relative angular position at which the inlet portion is arranged with respect to the particle outlet 18 may be changed.

However, the locking means 62 may alternatively assume a locking position. In the locking position, the blocking element 66 is arranged in a portion of the slot 68 which is connected to the guiding slot 70. In other words, in the locking position, the blocking element 66 is arranged at a position of the slot 68 which mates with the guiding slot 70.

Consequently, an abutment surface 74 of the blocking element 66 and a counter-abutment surface 76 of the engagement section 40 are arranged adjacent to one another. In the present example, the abutment surface 74 and the counter-abutment surface 76 are arranged axially opposite to one another.

Due to this arrangement of the blocking element 66, the guiding portion 72 cannot enter the slot 68.

In other words, the blocking element 66 is arranged between the engagement section 40 and the body section 38 of the inlet portion 34.

Thus, in the locking position of the locking means 62, the pair of teeth 44 is not able to move axially by resiliently deforming the arms 48. Consequently, it is not possible to alter a predefined angular position in which the inlet portion 34 is arranged with respect to the particle outlet 18. In other words, a current angular relative position of the inlet portion 34 with respect to the particle outlet 18 is secured or locked.

According to an option, the abutment surface 74 of the blocking element 66 and/or the counter-abutment surface 76 of the engagement section 40 comprise a portion which is inclined when regarded in a radial direction. Such an inclination facilitates moving the locking means 62 into the locking position, i.e. bringing the abutment surface 74 and the counter-abutment surface 76 in a position adjacent to one another. According to another option, the abutment surface 74 of the blocking element 66 and/or the counter-abutment surface 76 of the engagement section 40 are inclined when regarded in a radial direction. Also such a configuration facilitates moving the locking means 62 into the locking position, i.e. bringing the abutment surface 74 and the counter-abutment surface 76 in a position adjacent to one another.

In the present example, the carrier element 64 may be secured in both a rotational position associated with the locking position of the locking means 62 and a rotational position associated with the release position of the locking means 62.

To this end, the carrier element comprises a securing protrusion 75 extending radially inwards at one circumferential end of the carrier element 64.

On the outer circumference of the inlet portion 34, two corresponding securing depressions 77a, 77b are provided which are spaced from one another along a circumferential direction.

Thus, the securing protrusion 75 may engage one of the securing depressions 77a, 77b if in the rotational position associated with the locking position of the locking means 62 and engage the respective other one of the securing depressions 77a, 77b if in the rotational position associated with the release position of the locking means 62.

It is noted that the carrier element 64, more precisely the securing protrusion 75, is able to selectively engage one of the securing depressions 77a, 77b due to the inherent resilience of the carrier element 64 as has been mentioned before.

It is noted that in order to facilitate understanding of the design of the connector 20, the connector-sided connection means 56 and the carrier element 64 are not shown in FIGS. 5 to 7.

The connector 20 as shown in the Figures additionally comprises an indicator means 78.

The indicator means 78 may indicate whether the locking means 62 is blocking a movement of the engagement section 40 relative to the body section 38 or allowing a movement of the engagement section 40 relative to the body section 38. In other words, the indicator means 78 indicates whether the locking means 62 is in the locking position or in the release position.

To this end, a window 80 is provided on the carrier element 64. In other words, the carrier element 64 comprises an opening through which a user may look. In the present example, a viewing direction associated with the window corresponds to a radial direction.

Additionally, a sign representing the release position and a sign representing the locking position are provided on an outer circumference of the inlet portion 34. In the present example, a closed padlock represents the locking position, and an open padlock represents the release position.

These signs are arranged such that the sign representing the release position is visible through the window 80 if the locking means 62 is in the release position. Moreover, the sign representing the locking position is visible through the window 80 if the locking means 62 is in the locking position.

The connector 20 additionally comprises an overload protection means 82. The overload protection means 82 allows to avoid damaging of the connector 20 in case of overload.

In more detail, the abutment surface 74 of the blocking element and/or the counter-abutment surface 76 of the engagement section are inclined when regarded along a circumferential direction.

Thus, in a case in which the locking means 62 is in the locking position and the engagement section 40, i.e. the counter-abutment surface 76 is axially pushed against the blocking element 66, more precisely against the abutment surface 76, with a comparatively high force, the inclination of the abutment surface 74 and/order counter abutment surface 76 has the effect that the blocking element 66 is forced radially outwards with respect to the inlet portion 34. Thus, an axial movement of the engagement section 40 is permitted.

The connector 20 also comprises a tube-shaped outlet portion 84. The tube-shaped outlet portion 84 extends along an outlet axis 84a. The tube-shaped outlet portion 84 is configured for coupling to the particle receiving device, e.g. the particle collection container or the tube or hose.

In the present example, the outlet portion 84 and the inlet portion 34 connected to one another at an angle. This means that the inlet axis 34a and the outlet axis 84a enclose an angle smaller than 180° and bigger than 0°. In the present example, this angle is approximately 130°.

This allows to arrange the particle receiving device at a spatial location which does not hinder the use of the handheld machine tool 12.

The handheld machine tool assembly 10 may be operated using a method for operating the handheld machine tool assembly 10.

In a first step S1 of this method, the locking means 62 is in the release position.

An angular engagement position of the connector 20 with respect to the particle outlet 18 is selected out of a plurality of predefined angular engagement positions by turning the connector 20, more precisely the inlet portion 34, with respect to the particle outlet 18.

Once an appropriate angular engagement position has been found, further rotation of the connector 20 with respect to the particle outlet 18 is locked in a second step S2. To this end, the locking mechanism 62 assumes the locking position.

Figure 10:
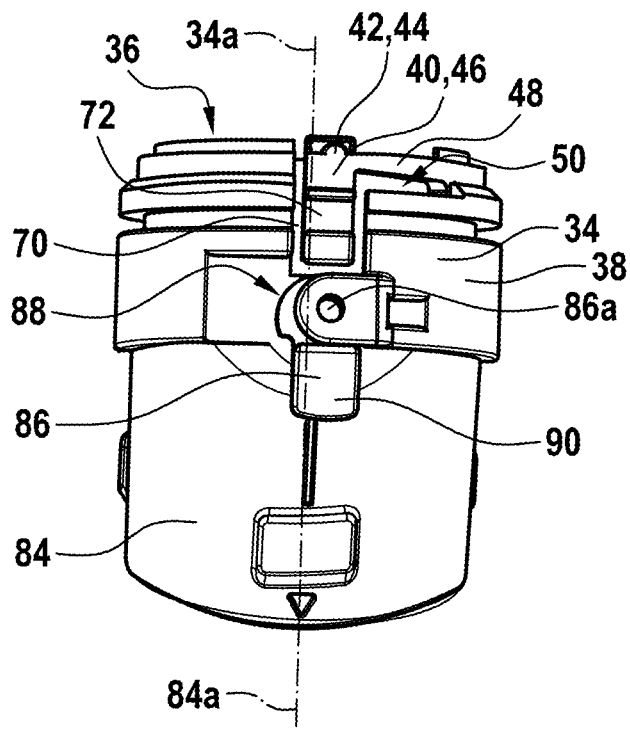
Figure 11:
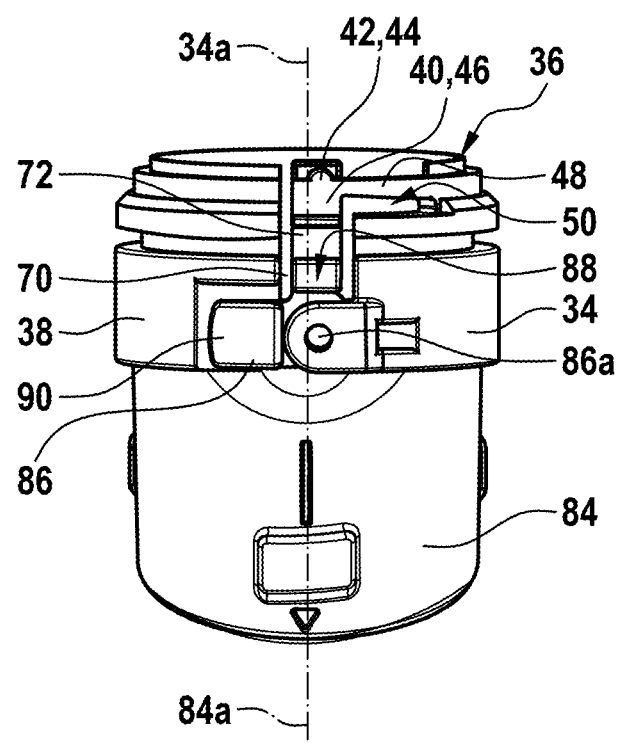
FIG. 11 shows the connector of FIG. 10, wherein the locking means is in a locking position.
Figure 12:
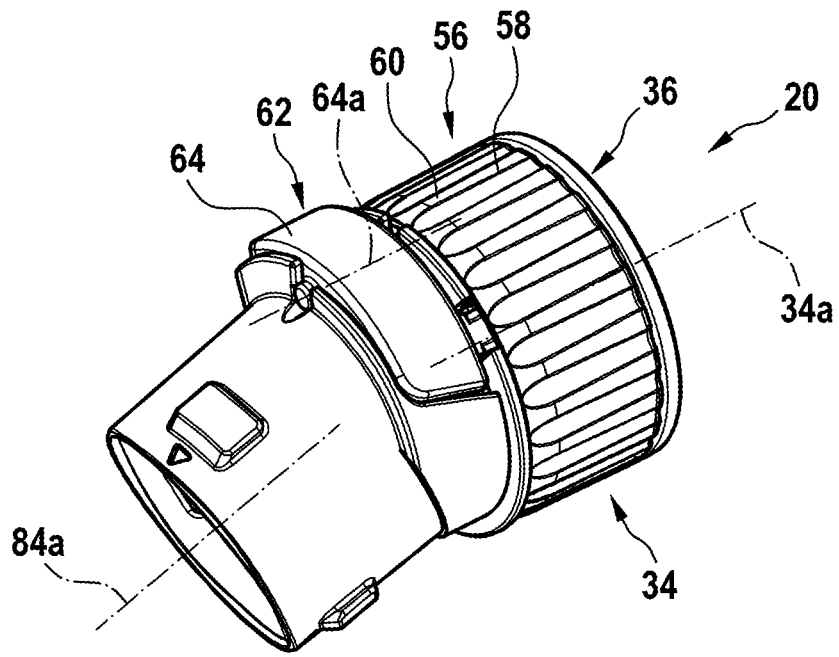
FIG. 12 shows a connector according to another embodiment of the present invention in a perspective view.
Figure 13:
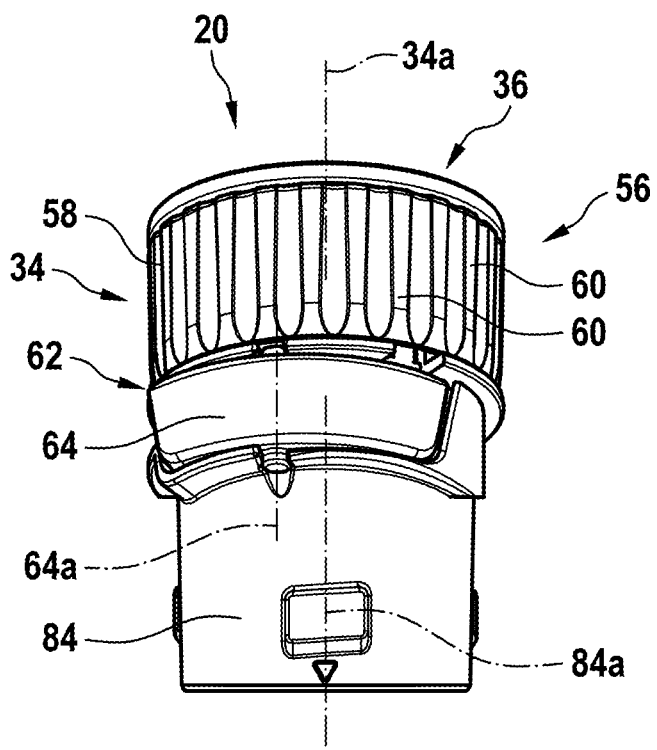
FIG. 13 shows the connector of FIG. 12 in a top view.
Figure 14:
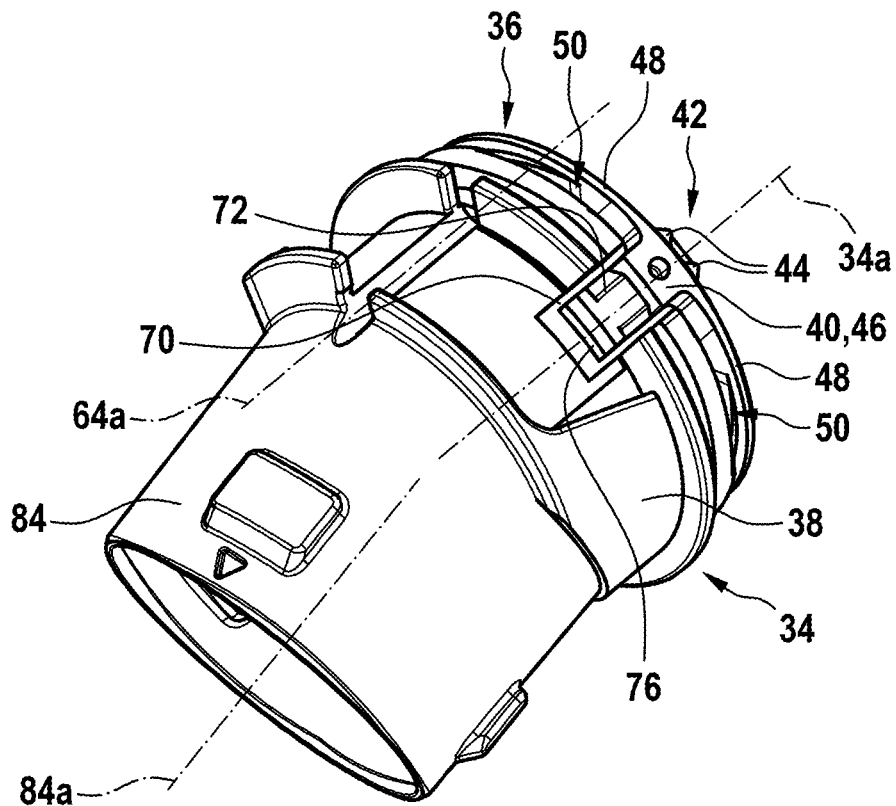
FIG. 14 shows selected parts of the connector of FIGS. 12 and 13 in a perspective view.

FIGS. 10 and 11 show another embodiment of the connector 20. For reasons of better visibility of the remaining components, the connection ring 58 is not represented in these Figures. The connection ring 58 substantially corresponds to the connection ring 58 as has been explained in connection with the previous embodiments.

In the following, only the differences with respect to the previous embodiments will be explained. Otherwise, reference is made to the above explanations.

In the example of FIGS. 10 and 11, the engagement section 40 comprises one single tooth 44 only. Moreover, the support portion 46 supporting the tooth 44 is connected to the body section 38 via one resilient arm 48 only.

Moreover, the locking means 62 is designed differently.

Instead of the ring-shaped carrier element, the locking means 62 now comprises a locking lever 86 arranged at an outer circumference of the inlet portion 34.

The locking lever 86 is rotatably supported on the body section 38 of the inlet portion 34 such that the locking lever 86 is rotatable around a lever axis 86a.

The lever axis 86a extends radially on the body section 38.

Moreover, the locking lever 86 is arranged such that it is located opposite the counter-abutment surface 76 of the guiding portion 72 of the engagement section 40.

In order to do so, the locking lever 86 is arranged in a flattened portion of the outer circumference of the inlet portion 34 in the example of FIGS. 10 and 11.

The locking lever 86 comprises a blocking surface 88 which corresponds to the abutment surface of the previous embodiments.

The blocking surface 88 is at least partially eccentric with respect to the lever axis 86a.

Moreover, the locking lever 86 comprises a gripping portion 90.

The blocking surface 88 and the gripping portion 90 are essentially arranged on opposite sides of the lever axis 86a.

Consequently, due to the rotatable support of the locking lever 86 and the at least partially eccentric design of the blocking surface 88, the locking lever 86 may be manually brought into a first rotational position in which the blocking surface 88 is arranged directly adjacent to the counter-abutment surface 76 or even contacts the counter-abutment surface 76 (cf. FIG. 11). Thus, in this first rotational position, the guiding portion 72 and, thus, the tooth 44 is not able to move along an axial direction. Consequently, the first rotational position of the locking lever 86 corresponds to a locking position of the locking means 62.

Alternatively, the locking lever 86 may be manually brought into a second rotational position that differs from the first rotational position and in which the blocking surface 88 is arranged at a distance from the counter-abutment surface 76 (cf. FIG. 10). Thus, in this second rotational position, the guiding portion 72 and, thus, the tooth 46 is free to move along an axial direction towards the locking lever 86. Consequently, the second rotational position of the locking lever 86 corresponds to a release position of the locking means 62.

Altogether, the blocking surface 88 may be selectively arranged adjacent to the engagement section 40 by rotating the lever 86.

In the example shown in FIGS. 10 and 11, the first rotational position and the second rotational position enclose an angle of approximately 90°.

A further example of the connector 20 is shown in FIGS. 12 to 16. As before, only the differences with respect to the previous embodiments will be explained. Otherwise, reference is made to the above explanations. In order to facilitate understanding of the following explanations, the connector-sided connection means 56 and the carrier element 64 are not shown in FIG. 14.

Also in the embodiment of FIGS. 12 to 16, the locking means 62 comprises a ring-shaped carrier element 64.

However, in contrast to the first embodiment, the carrier element 64 is rotatably supported on the inlet portion 34 such that it is rotatable around an axis 64a of rotation, which extends in parallel and at a distance with respect to the inlet axis 34 *a*. The distance is larger than zero and in the example shown in FIGS. 12 to 16 substantially corresponds to a radius of the inlet portion 34. Put otherwise, the carrier element 64 is rotatable around an axis 64a of rotation which is essentially located on an outer circumference of the inlet portion 34.

As before, the ring-shape of the carrier element 64 relates to a partial ring-shape only. In the example of FIGS. 12 to 16, the partial ring-shape of the carrier element 64 relates to a ring portion extending over 90° or less. Consequently, this carrier element 64 may as well be called arc-shaped. The arc extends substantially perpendicular to the axis of rotation 64a, wherein the axis of rotation is arranged in the middle of the arc, or at least in a mid third of the arc.

Figure 15:
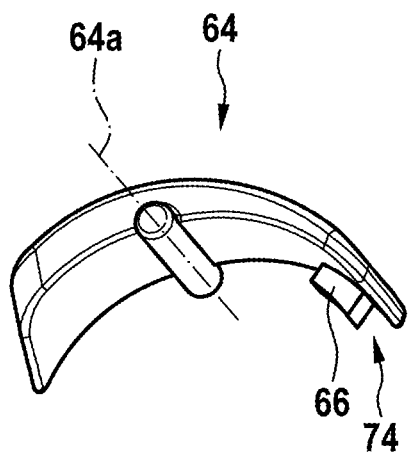
FIG. 15 shows a ring-shaped carrier element of the connector of FIGS. 12 to 14 in a perspective view.
Figure 16:
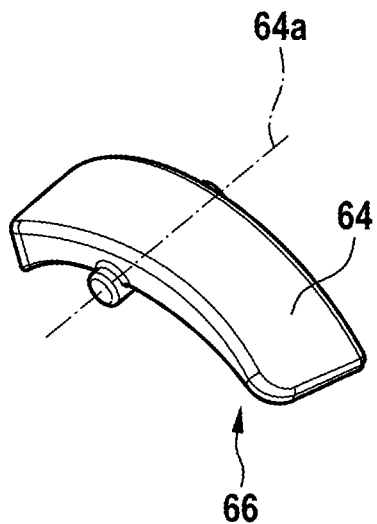
FIG. 16 shows the ring-shaped carrier element of FIG. 15 from a different perspective.
Figure 17:
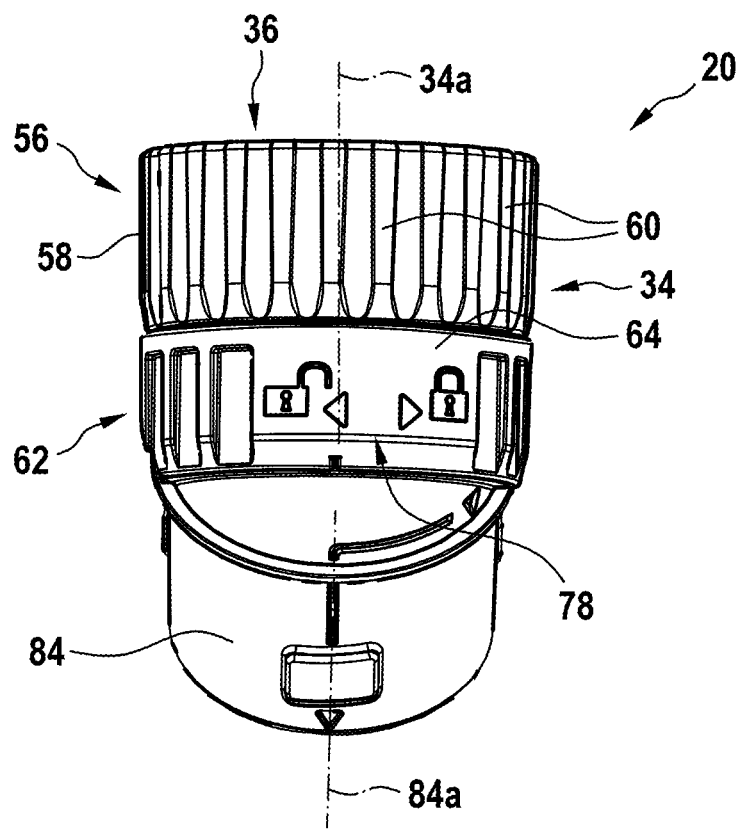
FIG. 17 shows a connector according to still another embodiment of the present invention in a top view.
Figure 18:
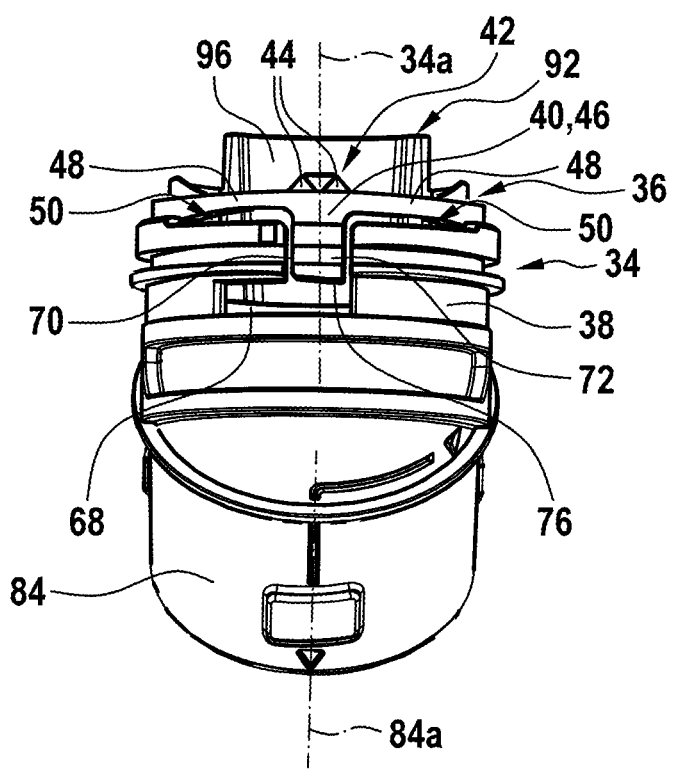
FIG. 18 shows selected parts of the connector of FIG. 17 in a top view.
Figure 19:
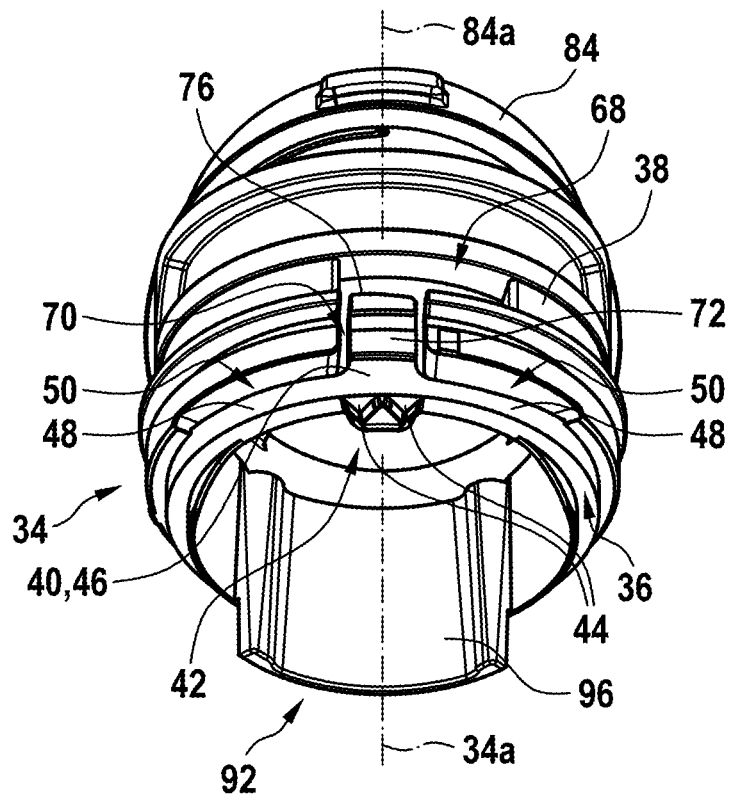
FIG. 19 shows the selected parts of the connector of FIG. 18 in a perspective view.
Figure 20:
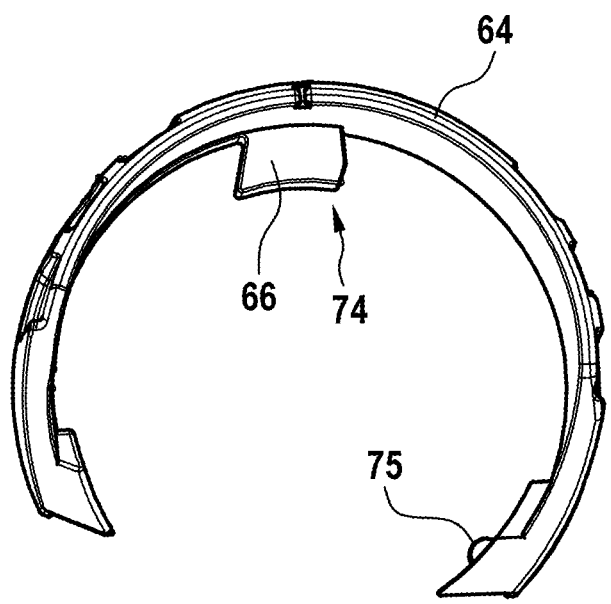
FIG. 20 shows a ring-shaped carrier element of the connector of FIG. 17 in a perspective view.

As in the first example, the blocking element 66 is a plate-shaped or tab-shaped protrusion extending radially inward from the carrier element 64 (cf. FIG. 15). In the example of FIGS. 12 to 16, the blocker element 66 is arranged at one circumferential end of the carrier element 64.

Consequently, by turning or rocking the carrier element 64 around the axis 64a of rotation, the blocking element 66 may be substantially moved along a radial direction of the inlet portion 34. Thus, in a first rotational position of the carrier element 64 which corresponds to a first radial position of the blocking element 66, the blocking element 66 may be placed at an end of the guiding slot 70 more precisely, between an end of the guiding slot 70 and the counter-abutment surface 76 of the guiding portion 72. Thus, in this position of the blocking element 66, the guiding portion 72 and, thus, teeth 44, are not able to move along an axial direction due to the fact that the blocking element 66 is blocking this movement.

Consequently, this rotational position of the carrier element 64 and the radial position of the blocking element 66 correspond to the locking position of the locking means 62.

In a second rotational position of the carrier element 64 which corresponds to a second radial position of the blocking element 66, the blocking element 66 may be placed outside the guiding slot 70. Consequently, a movement of the guiding portion 72 within the guiding slot 70 is not hindered by the blocking element 66. Thus, in the second rotational position of the carrier element 64 and the corresponding second radial position of the blocking element 66 correspond to a release position of the locking means.

The locking means 62 may be switched between the locking position of the release position by manually pushing on an appropriate portion of the carrier element 64 in a radially inward direction.

A further example of the connector 20 is shown in FIGS. 17 to 20. As before, only the differences with respect to the previous embodiments will be explained. Otherwise, reference is made to the above explanations. In order to facilitate understanding of the following explanations, the connector-sided connection means 56 and the carrier element 64 are not shown in FIGS. 18 and 19.

The embodiment of FIGS. 17 to 20 may be considered as a variant of the connector 20 as has been explained in connection with FIGS. 1 to 9. One difference with respect to this embodiment essentially relates to the indicator means 78.

In the embodiment of FIGS. 17 to 20, the indicator means 78 does not comprise a window. Instead, a sign indicating the release position and a sign indicating the locking position are provided on an outer circumference of the ring-shaped carrier element 64.

In the example shown in the Figures, the sign indicating the release position comprises a padlock in an open state and a triangle or arrowhead pointing into a direction into which the carrier element 64 must be turned in order to bring the locking means 62 into the release position.

The sign indicating the locking position comprises a padlock in a closed state and a triangle or arrowhead pointing into a direction into which the carrier element 64 must be turned in order to bring the locking means 62 into the locking position.

The connector 20 of FIGS. 17 to 20 additionally comprises a connector-sided abutment means 92.

The connector-sided abutment means 92 is configured to interact with a machine-sided abutment means 94 such that a rotation of the inlet portion 34 with respect to the particle outlet 18 is limited. In other words, only predefined relative angular positions of the inlet portion 34 relative to the particle outlet 18 may be reached, whereas others are not reachable.

In the example of FIGS. 17 to 20, the connector-sided abutment means 92 comprises a bar-shaped protrusion 96 axially extending from the inlet portion 34 in a direction away from the remaining components of the inlet portion 34. Due to this configuration, the bar-shaped protrusion 96 may as well be called a tongue.

The protrusion 96 or tongue is not perfectly flat, but is bent such that it follows a portion of an inner circumference of the inlet portion 34 to which it is fixedly connected.

Consequently, in a state in which the connector 20 is mounted on the particle outlet 18 (cf. FIG. 21), the protrusion 96 extends into the particle outlet 18 and, at least a portion of the protrusion 96 is arranged adjacent to an inner circumference of the particle outlet 18.

The machine-sided abutment means 94 comprises at least two protrusions 98 extending from an inner circumference of the particle outlet 18. These two protrusions 98 are arranged at different circumferential positions, and are arranged such that the protrusion 96 or tongue may be circumferentially arranged between these two protrusions 98, but is not able to circumferentially pass any of these two protrusions 98. Consequently, a rotation of the inlet portion 34 with respect to the particle outlet 18 is limited. Put otherwise, the inlet portion 34 may only rotate with respect to the particle outlet 18 between a first rotational position in which the protrusion 96 or tongue abut against a first one of the protrusions 98 and a second rotational position in which the protrusion 96 or tongue abut against a second one of the protrusions 98.

Figure 21:
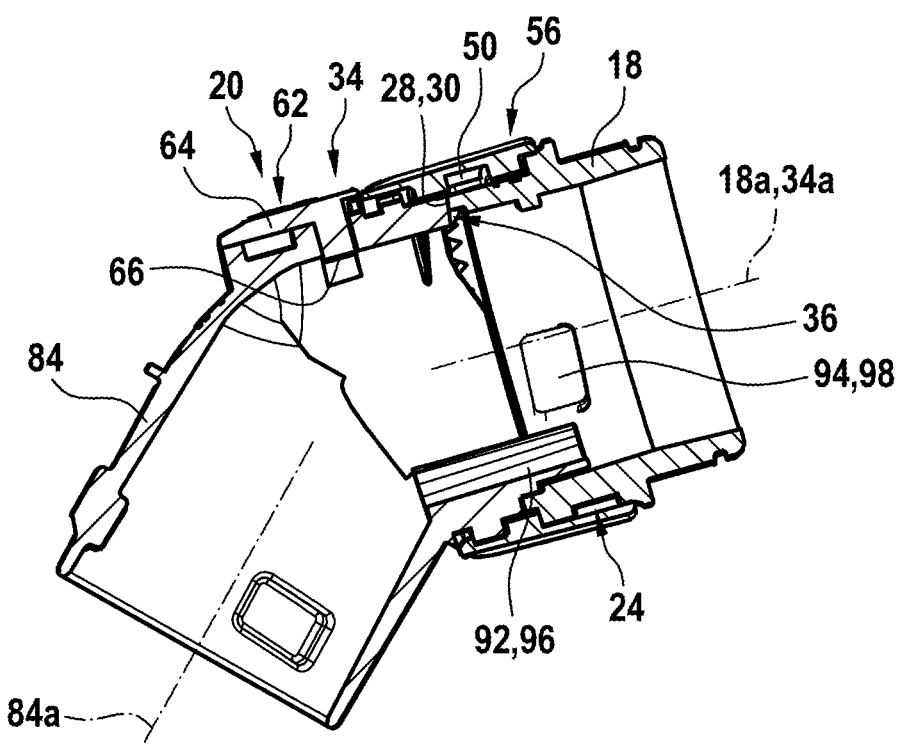
FIG. 21 shows the connector of FIG. 17 in a state in which it is coupled to a handheld machine tool in a sectional view.

It is noted that due to the sectional view taken in FIG. 21 only one protrusion 98 is visible.

It is further noted that the connector-sided abutment means 92 is separate from the engagement section 40 and from the locking means 62. Consequently, even though the connector-sided abutment means 92 has been explained in connection with the embodiment of FIGS. 17 to 20 only, the connector sided abutment means 92 may as well be used in the embodiments of the connector 20 as explained in connection with FIGS. 1 to 16.

Figure 22:
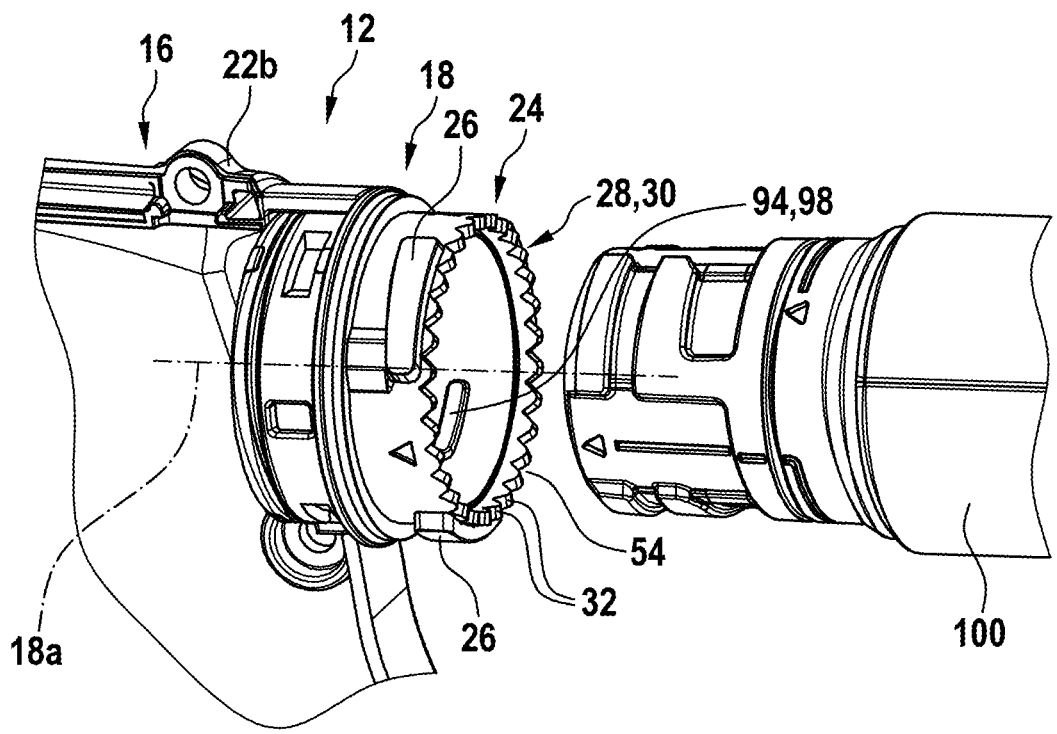
FIG. 22 shows a portion of a handheld machine tool and an end of a hose leading to a vacuum cleaner.

It is additionally noted that the protrusions 98 may fulfill a dual functionality. This means that the protrusions 98 do not only serve as machine-sided abutment means 94 for limiting rotational positions of the connector 20 with respect to the particle outlet 18, but also for connecting a particle receiving device directly, i.e. without a connector 20, to the particle outlet 18. It is understood, that to this end, the particle receiving device must be equipped with a corresponding connection means. This is schematically shown in FIG. 22, wherein the particle receiving device is represented by a portion of a hose 100 of a vacuum cleaner.

Moreover, it is noted that in case the above-described method is executed in connection with a handheld machine-tool assembly 10 which comprises both connector-sided abutment means 92 and machine-sided abutment means 94, the plurality of predefined angular positions are restraint to a predefined interval of angular engagement positions. This interval of angular engagement positions corresponds to the rotational positions that are permitted by the connector-sided abutment means 92 and the machine inside abutment means 94.

LIST OF REFERENCE SIGNS 10 handheld machine tool assembly
12 handheld machine tool
14 saw blade
16 housing
18 particle outlet
18a machine outlet axis
20 connector
22a housing shell
22b housing shell
24 machine-sided connection means
26 protrusion
28 axial abutment feature
30 end face of the particle outlet
32 tooth
34 tube-shaped inlet portion of the connector
34a inlet axis
36 end face of the inlet portion
38 body section of the inlet portion
40 engagement section of the inlet portion
42 engagement geometry
44 tooth
46 support portion of the engagement section
48 resilient arm
50 gap
54 engagement counter-geometry
56 connector-sided connection means
58 connection ring
60 rib
62 locking means
64 carrier element
64a axis
66 blocking element
68 slot
70 guiding slot
72 guiding portion
74 abutment surface
75 securing protrusion
76 counter-abutment surface
77a securing depression
77b securing depression
78 indicator means
80 window
82 overload protection means
84 tube-shaped outlet portion
84a outlet axis
86 locking lever
86a lever axis
88 blocking surface
90 gripping portion
92 connector-sided abutment means
94 machine-sided abutment means
96 protrusion
98 protrusion
100 hose of a vacuum cleaner
S1 first step
S2 second step

The invention claimed is:
1. A connector for coupling a particle outlet of a handheld machine tool to a particle receiving device, the connector comprising:
   a tube-shaped inlet portion extending along an inlet axis and configured for coupling to the particle outlet of the handheld machine tool,
   a connector-sided connection configured for connecting the inlet portion to the particle outlet in an axially fixed and rotatable manner,
   a tube-shaped outlet portion extending along an outlet axis and configured for coupling to the particle receiving device,
   wherein the inlet portion comprises a body section and an engagement section,
   wherein the engagement section is resiliently coupled to the body section, wherein the engagement section comprises an engagement geometry configured for mating with an engagement counter-geometry provided on the particle outlet, such that a positive locking effective along a circumferential direction is provided between the engagement geometry and the engagement counter-geometry, and wherein, using the resilient coupling, the engagement geometry and the engagement counter-geometry may mate at different predefined angular engagement positions, and wherein a lock is coupled to the inlet portion, the lock configured for selectively blocking a movement of the engagement section relative to the body section.

2. The connector of claim 1, wherein the lock comprises a blocker selectively arrangeable between the engagement section and the body section.

3. The connector of claim 2, wherein the lock comprises a ring-shaped carrier at least partially extending circumferentially around the inlet portion, wherein the blocker extends from the carrier in a radially inward direction.

4. The connector of claim 3, wherein the ring-shaped carrier is rotatably supported on the inlet portion, wherein a corresponding axis of rotation coincides with the inlet axis or extends in parallel to the inlet axis, the inlet axis and the axis of rotation arranged at a distance larger than zero.

5. The connector of claim 2, wherein the blocker comprises an abutment surface and the body section or the engagement section comprises a counter-abutment surface, wherein the abutment surface and the counter-abutment surface are arranged adjacent to one another at least in a situation in which the lock is blocking a movement of the engagement section relative to the body section, and wherein the abutment surface and/or the counter-abutment surface are inclined when regarded along a circumferential direction.

6. The connector of claim 1, wherein the lock comprises a locking lever rotatably supported on the body section such that the locking lever is rotatable around a lever axis, wherein the locking lever comprises a blocking surface which may be selectively arranged adjacent to the engagement section by rotating the locking lever.

7. The connector of claim 6, wherein the blocking surface is at least partially eccentric with respect to the lever axis.

8. The connector of claim 6, wherein the lever axis extends radially on the body section.

9. The connector of claim 1, further comprising an indicator, indicating whether the lock is blocking a movement of the engagement section relative to the body section or allowing a movement of the engagement section relative to the body section.

10. The connector of claim 1, wherein the connector-sided connection comprises a connection ring rotatable with respect to the inlet portion around a ring axis coinciding with the inlet axis, wherein the connection ring comprises a screw and/or bayonet for connecting the inlet portion to the particle outlet.

11. The connector according to claim 1, comprising a connector-sided abutment configured for limiting a rotation of the inlet portion with respect to the particle outlet, the connector-sided abutment being separate from the engagement section and from the lock.

12. A handheld machine tool, comprising:
a particle outlet connected to a particle receiving device via a connector, the connector including:
a tube-shaped inlet portion extending along an inlet axis and configured for coupling to the particle outlet of the handheld machine tool,
a connector-sided connection configured for connecting the inlet portion to the particle outlet in an axially fixed and rotatable manner,
a tube-shaped outlet portion extending along an outlet axis and configured for coupling to the particle receiving device,
wherein the inlet portion comprises a body section and an engagement section,
wherein the engagement section is resiliently coupled to the body section,
wherein the engagement section comprises an engagement geometry configured for mating with an engagement counter-geometry provided on the particle outlet, such that a positive locking effective along a circumferential direction is provided between the engagement geometry and the engagement counter-geometry, and
wherein, using the resilient coupling, the engagement geometry and the engagement counter-geometry may mate at different predefined angular engagement positions, and
wherein a lock is coupled to the inlet portion, the lock configured for selectively blocking a movement of the engagement section relative to the body section,
wherein the particle outlet is tube-shaped and extends along a machine outlet axis, the particle outlet including:
an axial abutment feature configured to abut axially against the connector,
a machine-sided connection configured for coupling with the connector-sided connection, and
an engagement counter-geometry configured to mate with an engagement geometry provided on the connector.

13. The handheld machine tool of claim 12, wherein the particle outlet further comprises a machine-sided abutment configured for limiting a rotation of the connector with respect to the particle outlet.

14. A handheld machine tool assembly comprising:
a handheld machine tool including:
a particle outlet connectable to a particle receiving device via a connector, the connector including:
a tube-shaped inlet portion extending along an inlet axis and configured for coupling to the particle outlet of the handheld machine tool,
a connector-sided connection configured for connecting the inlet portion to the particle outlet in an axially fixed and rotatable manner,
a tube-shaped outlet portion extending along an outlet axis and configured for coupling to the particle receiving device,
wherein the inlet portion comprises a body section and an engagement section,
wherein the engagement section is resiliently coupled to the body section,
wherein the engagement section comprises an engagement geometry configured for mating with an engagement counter-geometry provided on the particle outlet, such that a positive locking effective along a circumferential direction is provided between the engagement geometry and the engagement counter-geometry, and
wherein, using the resilient coupling, the engagement geometry and the engagement counter-geometry may mate at different predefined angular engagement positions, and
wherein a lock is coupled to the inlet portion, the lock configured for selectively blocking a movement of the engagement section relative to the body section, wherein the particle outlet is tube-shaped and extends along a machine outlet axis, the particle outlet including:
an axial abutment feature configured to abut axially against the connector,
a machine-sided connection configured for coupling with the connector-sided connection, and
an engagement counter-geometry configured to mate with an engagement geometry provided on the connector,
wherein the connector is coupled to the particle outlet of the handheld machine tool.

* * * * *